United States Patent
Hashimoto

(10) Patent No.: US 6,285,929 B1
(45) Date of Patent: Sep. 4, 2001

(54) PROCESSIONAL TRAVEL CONTROL APPARATUS

(75) Inventor: Hideki Hashimoto, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/559,944

(22) Filed: Apr. 27, 2000

(30) Foreign Application Priority Data

Apr. 27, 1999 (JP) .................................................. 11-120763

(51) Int. Cl.$^7$ ........................................................ G05D 1/00
(52) U.S. Cl. .................... 701/23; 701/1; 701/96; 701/301; 318/587; 180/168; 340/903; 342/455
(58) Field of Search ........................... 701/1, 23, 22, 701/96, 117, 300, 301; 318/587; 180/167, 168; 340/903; 342/455, 456

(56) References Cited

U.S. PATENT DOCUMENTS

| | | | |
|---|---|---|---|
| 5,257,022 | * 10/1993 | Irie | 340/988 |
| 5,304,980 | * 4/1994 | Maekawa | 340/435 |
| 5,648,905 | * 7/1997 | Izumi et al. | 701/301 |
| 5,710,565 | * 1/1998 | Shirai et al. | 342/70 |
| 6,138,064 | * 10/2000 | Matsumoto et al. | 701/23 |

* cited by examiner

Primary Examiner—William A. Cuchlinski, Jr.
Assistant Examiner—Gertrude Arthur
(74) Attorney, Agent, or Firm—Carrier, Blackman & Associates; Joseph P. Carrier; Williwm D. Blackman

(57) ABSTRACT

A processional travel control apparatus that allows processional travel with a leading vehicle driven by a driver and a plurality of succeeding vehicles automatically following the leading vehicle, each of the vehicles 1-1 is provided with: an input device 1-2 for entering the total number of vehicles in a procession and the sequence number of each vehicle in the procession; a vehicle setting device 1-3 for setting each vehicle 1-1 as either a leading vehicle or a succeeding vehicle according to the sequence number of each vehicle 1-1 in the procession set by the input device 1-2; and a vehicle travelling control device 1-4 for instructing each vehicle 1-1 to travel in a procession according to the set sequence number in the procession. Hence a procession or the like can be formed essentially anywhere, including outside of conventional parking ports.

5 Claims, 23 Drawing Sheets

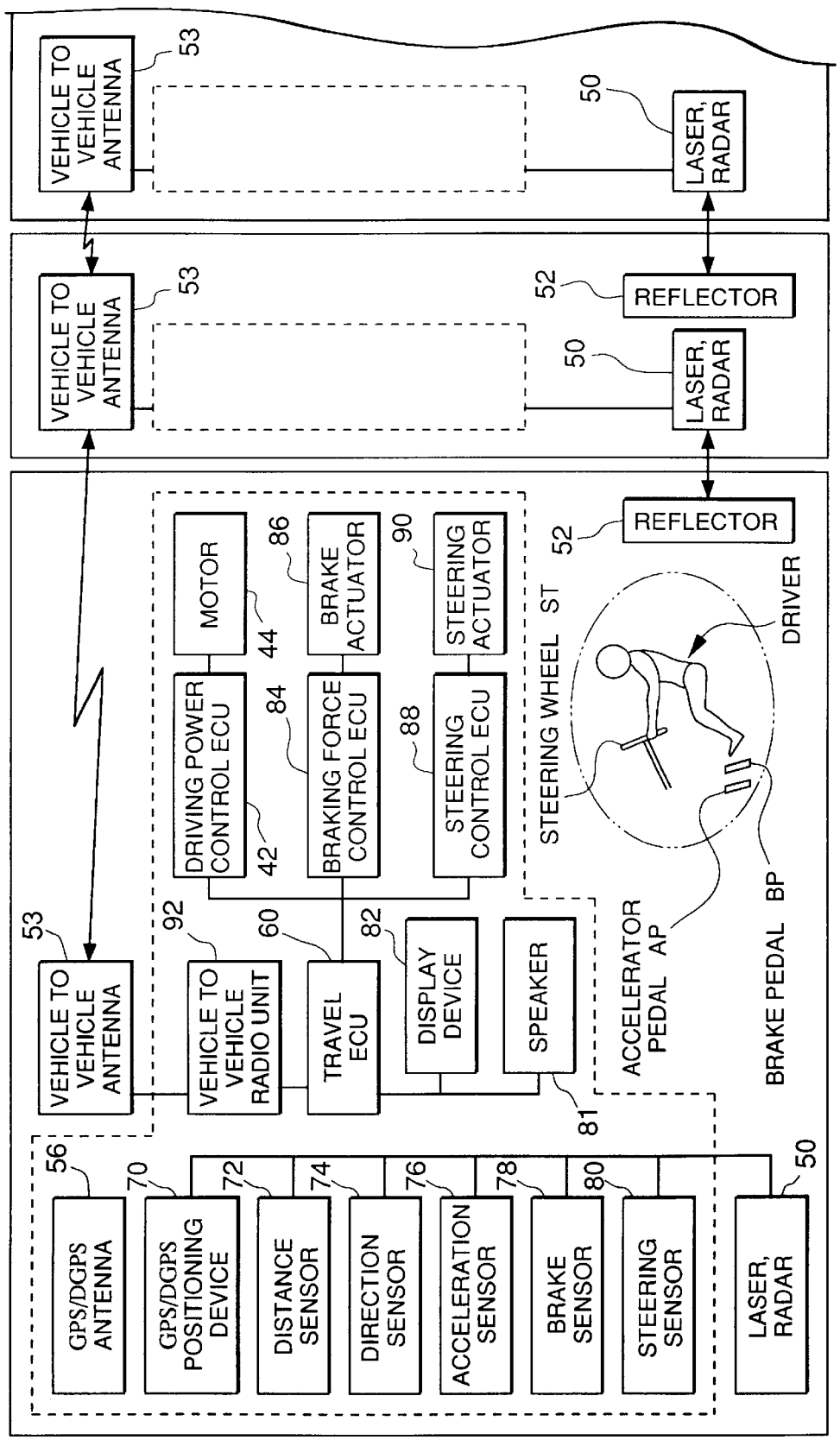

Fig. 5A  PROCESSION SETTING SCREEN
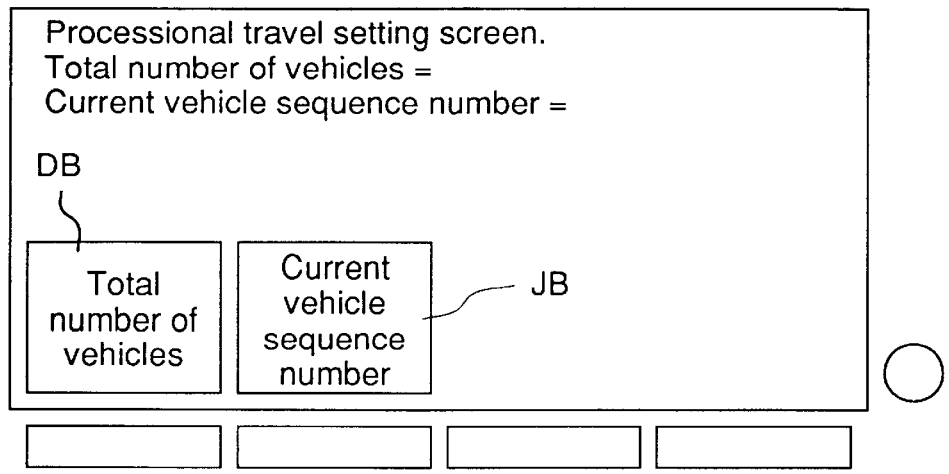
Fig. 5B  SCREEN DURING PROCESSION FORMATION
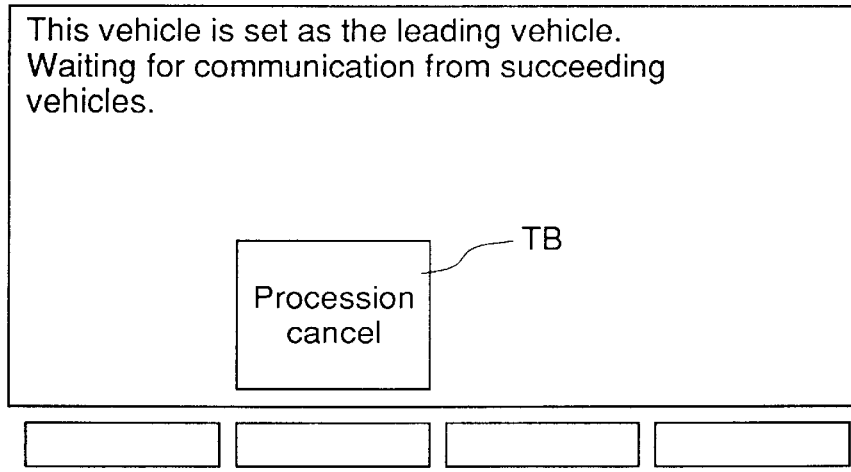
Fig. 5C  SCREEN DURING PROCESSIONAL TRAVEL
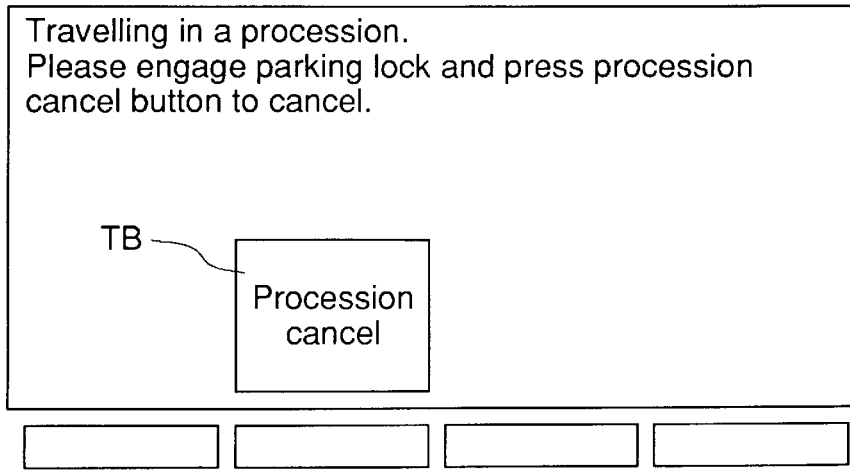

Fig. 6A
PROCESSION SETTING SCREEN
Fig. 6B
SCREEN DURING PROCESSION FORMATION

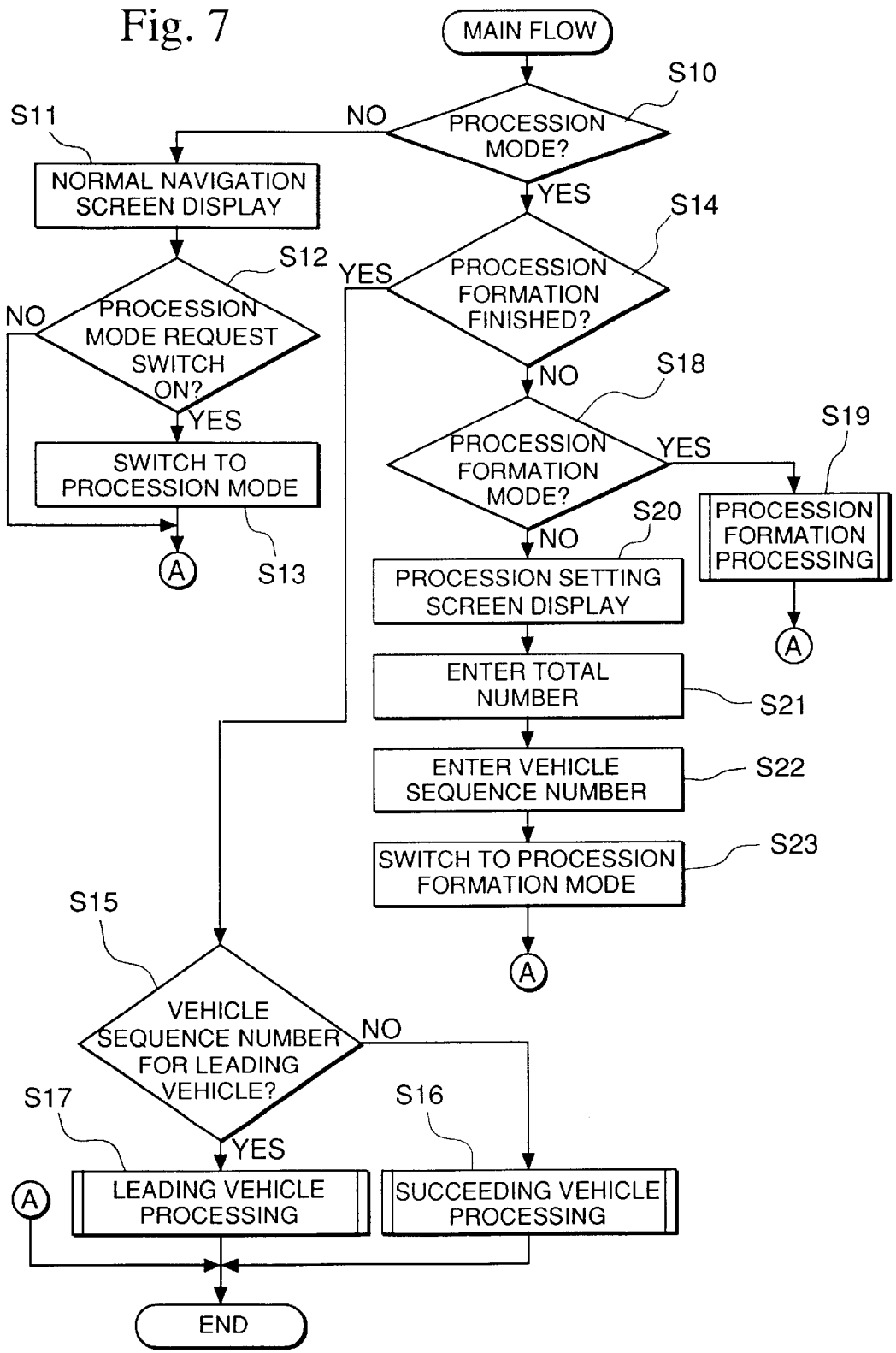

Fig. 11A  PROCESSION SETTING SCREEN
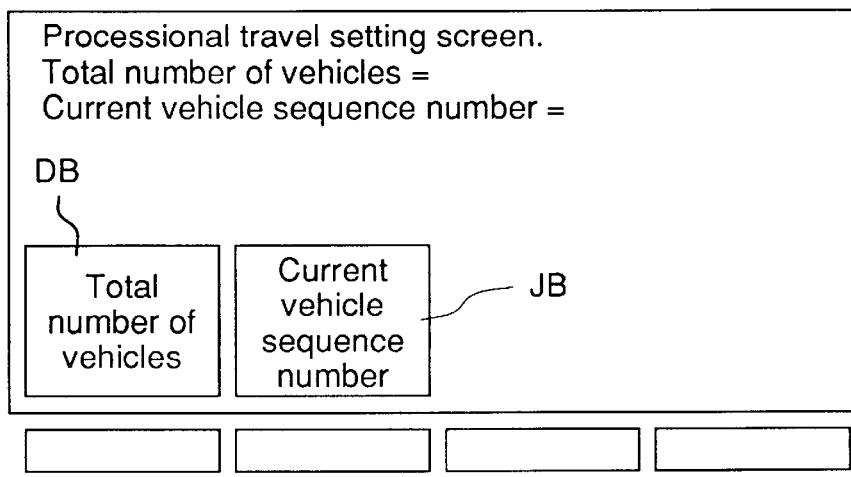
Fig. 11B  SCREEN DURING PROCESSION FORMATION
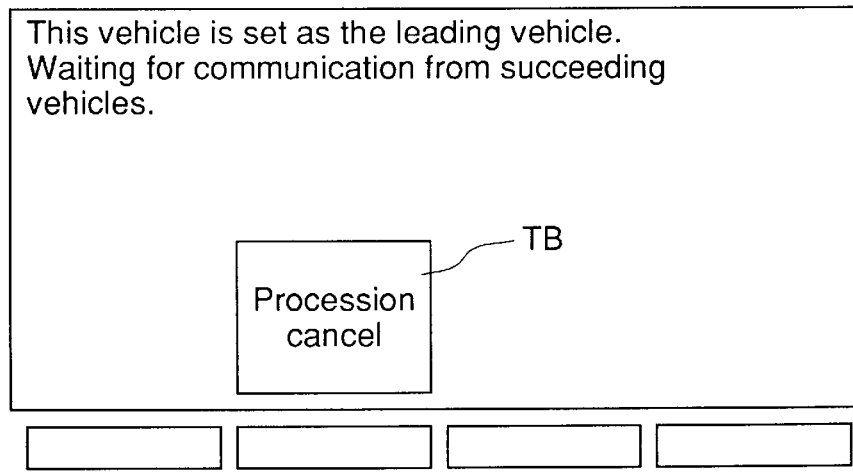
Fig. 11C  SCREEN DURING PROCESSIONAL TRAVEL
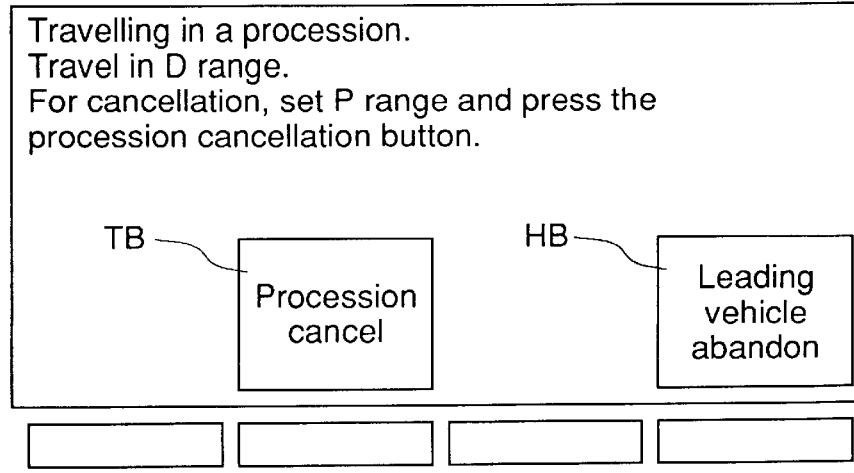

Fig. 11D  LEADING VEHICLE ABANDON SCREEN
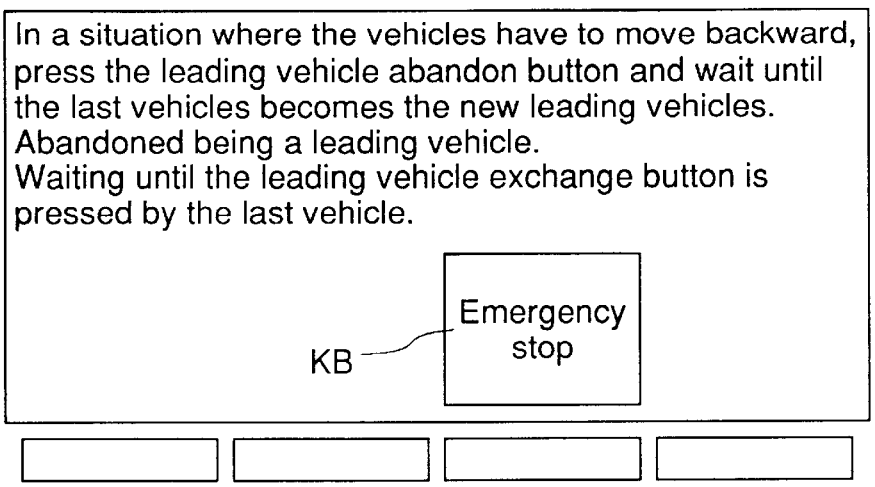
Fig. 12A  PROCESSION SETTING SCREEN
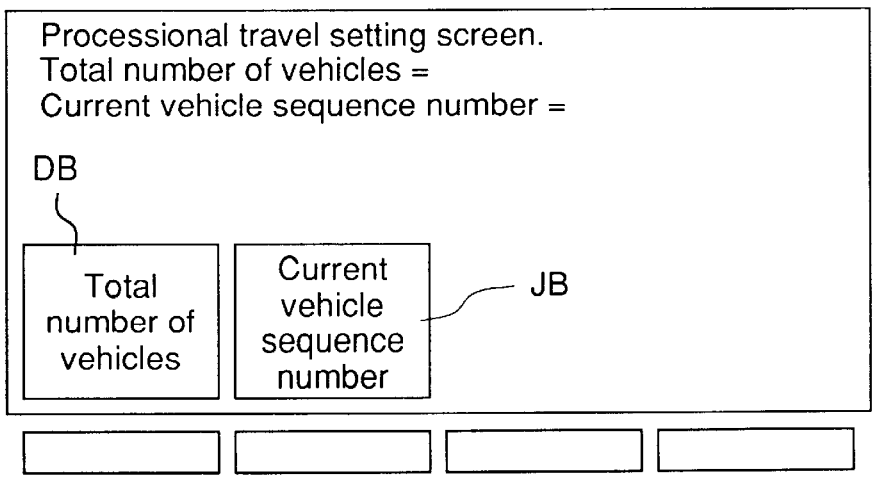
Fig. 12B  SCREEN DURING PROCESSION FORMATION AND TRAVEL
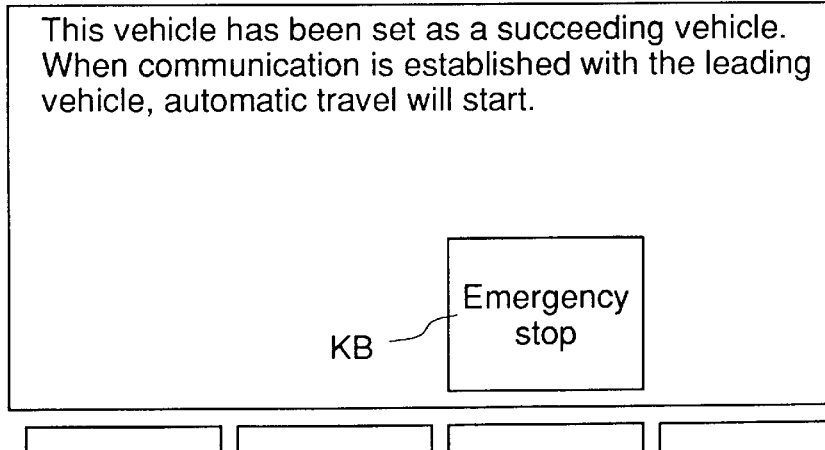

Fig. 13A

SCREEN DURING AUTOMATIC DRIVING OF THE ORIGINAL LEADING VEHICLE AS A SUCCEEDING VEHICLE (THE NEW LAST VEHICLE)

The last vehicle has been set as the leading vehicle.
This vehicle will travel backward automatically.
Please release the steering wheel and accelerator.

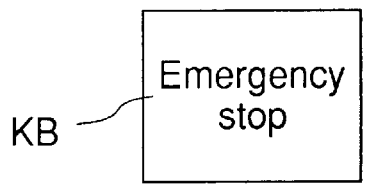

KB — Emergency stop

Fig. 13B

LEADING VEHICLE REVERT SCREEN

There is a leading vehicle exchange request from the last vehicle.
Please press the leading vehicle exchange button.

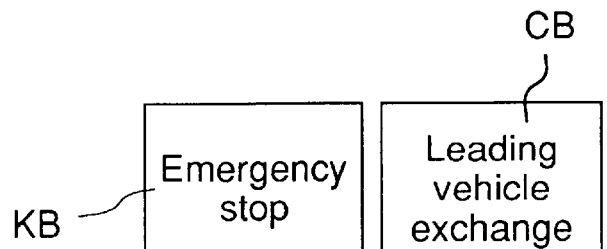

CB
KB — Emergency stop | Leading vehicle exchange

PROCESSION SETTING SCREEN

SCREEN DURING PROCESSION FORMATION
AND TRAVELLING AS A SUCCEEDING VEHICLE

SCREEN WHEN A LEADING VEHICLE ABANDON MESSAGE IS RECEIVED AFTER THE LEADING VEHICLE STOPS AND ABANDONS ITS POSITION AS THE LEADING VEHICLE

LEADING VEHICLE EXCHANGE DECLARATION SCREEN

PROCESSIONAL TRAVEL CONTROL APPARATUS

BACKGROUND OF THE INVENTION

1. Field of the Invention

The present invention relates to a processional travel control apparatus, which enables processional travel with a leading vehicle being driven by a driver and a plurality of vehicles automatically following the leading vehicle.

2. Description of the Related Art

In recent years when environmental problems have been highlighted, a technique for sharing electric vehicles within a certain area has been proposed to reduce problems of air pollution and traffic congestion. This type of technique for using shared vehicles requires a port (parking lot) for lending and returning the shared vehicles, and it is necessary to arrange a certain number of vehicles in each of these ports in respect to their utilization by users.

Generally, it is expected that ports for parking shared vehicles for this purpose will be provided in places where users converge, for example, in the vicinity of a station and the like. There is no problem if the usage time and usage frequency by the users are consistent in each port, however, if there is any variance, then there is a situation in which shared vehicles accumulate in a certain port. To solve this problem, a technique is proposed for arranging shared vehicles available for rent in appropriate ports as evenly as possible, whereby the vehicles are moved between ports by having a vehicle driven by a driver at the head of a procession and a plurality of driver-less vehicles following. (refer to Japanese Patent Application, First Publication No. Hei. 5-170008).

When travelling in a procession where succeeding vehicles follow a leading vehicle at the head, a system is used in which the succeeding vehicles follow the path of the leading vehicle. The leading vehicle sends vehicle speed, steering angle, vehicle position coordinates, direction, amount of torque required, brake pressure and the like, obtained from vehicle to vehicle communication, to the succeeding vehicles, and the succeeding vehicles follow the leading vehicle using the revised settings of the original vehicle's position and direction information obtained by radar.

Since the above-mentioned processional travel is used for moving shared vehicles between ports, it is necessary to receive information about the total number of vehicles and their sequence numbers in the procession, as communicated information from a control apparatus controlling the number of shared vehicles in a port, before travelling so as to form a procession. Accordingly, there is a problem in that it is impossible to form a procession outside a port (for example, on the travelling route between ports) where communicated information cannot be obtained from the control apparatus, or to cancel a procession, change the total number of vehicles and change the sequence numbers in the procession prior to travelling in a procession. Therefore, for example, in the case of collecting vehicles left in places other than at a port, travel in a procession cannot be performed.

Furthermore, there is a problem in that if a situation occurs where a vehicle in the procession needs to leave the procession while travelling in a procession, the number of vehicles in the procession cannot be changed after it has been formed, and the procession sequence cannot be modified while travelling in a procession.

Moreover, there is a problem in that, if procession cancellation, procession formation, change of the total number of vehicles and modification of the procession sequence numbers cannot be performed, it is impossible to rearrange the procession in an emergency stop in order to avoid danger or cope with a situation where the leading vehicle cannot move forward.

For example, if a location that the leading vehicle enters is under construction or has any obstacles, the vehicle cannot move forward further after it has entered, and inevitably has to move backward, a case with which the technique cannot cope. In this case where forward movement is impossible, since the procession is formed by a plurality of vehicles, it causes traffic congestion.

SUMMARY OF THE INVENTION

It is therefore an object of the present invention to provide a processional travel control apparatus which enables safe travel in a procession and procession formation even outside of ports or the like.

According to the first aspect of the present invention, in a processional travel control apparatus that allows processional travel with a leading vehicle driven by a driver and a plurality of succeeding vehicles automatically following the leading vehicle, each of the vehicles (for example, the vehicle 1-1 of the embodiment in FIG. 1) is provided with: an input device for entering the total number of vehicles in a procession and the sequence number of each vehicle in the procession (for example, the input device 1-2 of the embodiment in FIG. 1); a vehicle setting device for setting each vehicle as either a leading vehicle or a succeeding vehicle according to the sequence number of each vehicle in the procession as set by the input device (for example, the vehicle setting device 1-3 of the embodiment in FIG. 1); and a vehicle travel control device for instructing each vehicle to travel in a procession according to the set sequence number in the procession (for example, the vehicle travel control device 1-4 of the embodiment in FIG. 1).

By such a construction, it is possible to organize a formation of processions without defining a particular location.

According to the second aspect of the present invention, the processional travel control apparatus that allows processional travel with a leading vehicle driven by a driver and a plurality of succeeding vehicles automatically following the leading vehicle according to the first aspect, comprises a reverse travel device for driving the procession backward by setting the last vehicle of the procession as a head vehicle, by using the input device, and having a driver drive the last vehicle with the other vehicles following the last vehicle (for example, the vehicle travel control device 1-4 and the operation device 1-5 of the embodiment in FIG. 1).

Such a construction makes it possible, for example, in a situation where the leading vehicle enters a road under construction by mistake or enters a road with obstacles, to get out via the passage entered, by driving the procession backward with the last vehicle at the head.

According to the third aspect of the present invention, when the aforementioned reverse travel finishes, the input device of the processional travel control apparatus resets the authority of the head vehicle back to the head vehicle from the last vehicle so that normal travel in a procession is resumed.

Such a construction makes it possible to revert promptly to forward travel in a procession with the original leading vehicle at the head.

According to the fourth aspect of the present invention, the processional travel control apparatus comprises a procession stop device for stopping travel in a procession when an abnormality occurs, by sending an abnormality signal to each succeeding vehicle from the last manned vehicle (for example, the vehicle travel control device 1-4, the abnormality detecting switch 1-7 and the communication device 1-8).

By forming such a construction, in a situation where the leading vehicle and, for example, one of the succeeding vehicles has an occupant, when the occupant in the succeeding vehicle recognizes a problem and issues an emergency instruction, the processional travel control apparatus enables the automatically driven succeeding vehicles to stop safely.

BRIEF DESCRIPTION OF THE DRAWINGS

FIG. 4 is a block diagram showing the mutual relationship of electric vehicles while travelling in a procession along with their internal structures.

FIGS. 5A, 5B, and 5C are diagrams explaining the display contents of the display device of a leading vehicle in a case of normal travel in the first embodiment: 5A is a screen for a procession setting; 5B is a screen during procession formation; and 5C is a screen during travel in a procession.

FIGS. 6A and 6B are diagrams explaining the display content of the display device of a succeeding vehicle in a case of normal travel: 6A is a screen for procession setting; 6B is a screen during procession formation and travelling.

FIG. 7 is the main flowchart for the case of normal travelling in the first embodiment.

FIGS. 11A, 11B, 11C, and 11D are diagrams explaining the display content of the display device in the leading vehicle in a case where a forward travelling procession and a reverse travelling procession are possible in the second embodiment: 11A is a screen for procession setting; 11B is a screen during procession formation; 11C is a screen during processional travel; and 11D is a screen for the leading vehicle abandonment.

FIGS. 12A and 12B are diagrams explaining the display content of the display device in the succeeding vehicle in a case where a forward travelling procession and a reverse travelling procession are possible: 12A is a screen for setting a procession; 12B is a screen during procession formation and travel.

FIGS. 13A and 13B are diagrams explaining the display content of the display device in the original leading vehicle in a case where a forward travelling procession and a reverse travelling procession are possible: 13A is a screen for automatic driving after leading vehicle abandonment; 13B is a screen for the leading vehicle return.

DETAILED DESCRIPTION OF THE INVENTION

Hereinafter, embodiments of the present invention are described with reference to the drawings. First, a conceptual embodiment will be explained with FIG. 1. Here, the number of each member of the conceptual embodiment is different from that of the specific embodiment described later.

Figure 1:
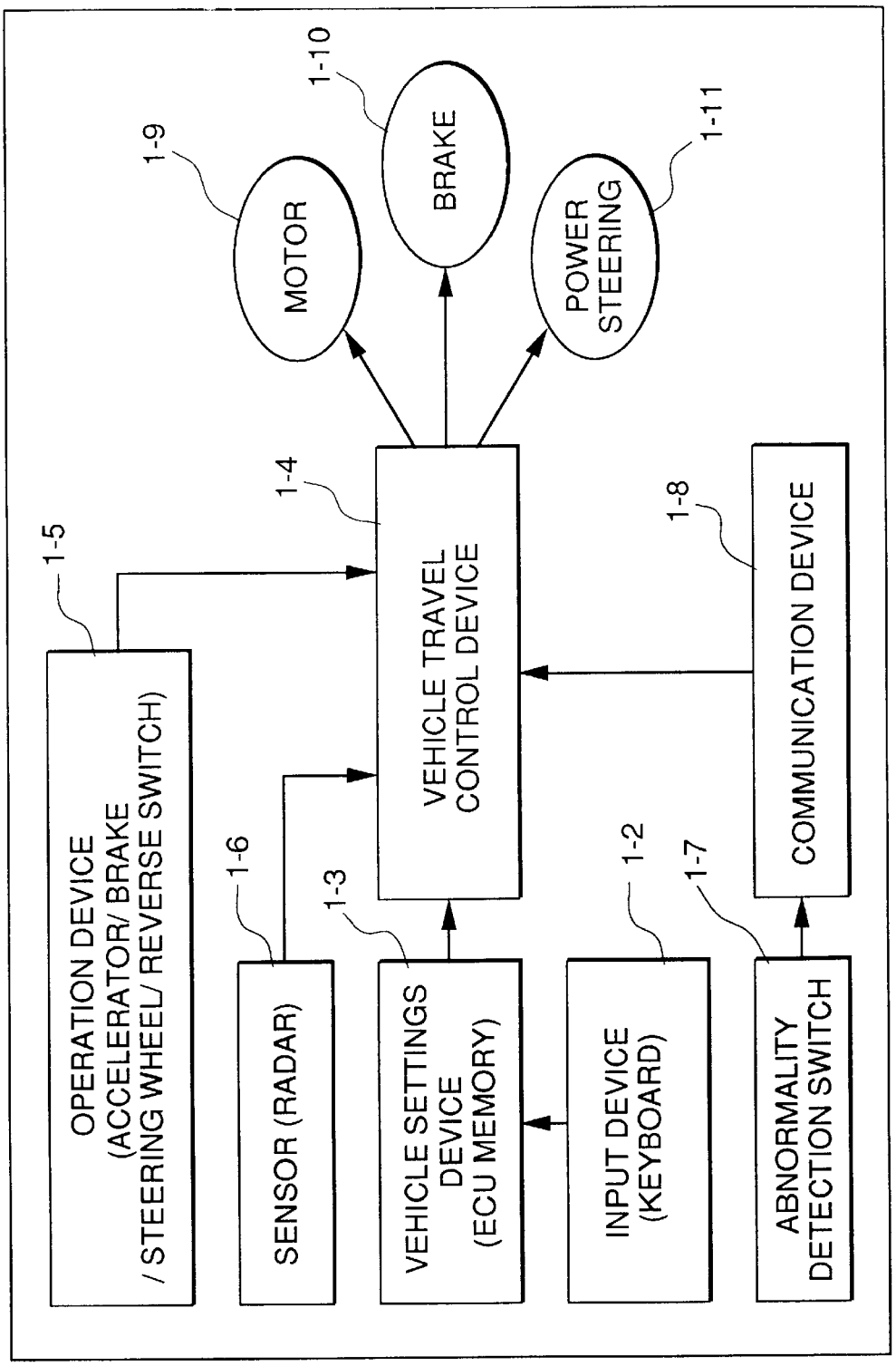
FIG. 1 is a block diagram showing a schematic embodiment of the present invention.

In FIG. 1, a vehicle 1-1 is qualitatively identical whether it is a leading vehicle or a succeeding vehicle. From a set number in the procession, it is recognized whether the vehicle is a leading vehicle or a succeeding vehicle, and the vehicle's number is known, and the functions of the control computer are changed. The vehicle 1-1, when set as a leading vehicle, is driven according to the driver's instructions (accelerator, brake, steering wheel, reverse switch and the like). The vehicle 1-1, when set as a succeeding vehicle, travels following the leading vehicle according to the control program which follows the sequence in the procession and the leading vehicle.

The vehicle 1-1 has operating controls 1-5 for the accelerator, brake, steering wheel, reverse switch and the like, a sensor (laser radar) 1-6, and a vehicle settings device 1-3. The vehicle settings device 1-3, which is a memory in an ECU, identifies the leading vehicle and the succeeding vehicles, and sets the current vehicle's number in the procession (procession number). The number of vehicles in the procession and the sequence number of travel in a procession are entered in the above-mentioned operation device 1-5 by the input device 1-2. Numeral 1-7 shows an abnormality-detection switch. The arrangement is such that when the abnormality-detection switch 1-7 is operated, a signal is entered into a vehicle travel control device 1-4 (ECU) via a communication device 1-8. Furthermore, a signal from the operation device 1-5 and the sensor 1-6 is also entered into the vehicle travel control device 1-4.

Next, a specific embodiment will be explained with reference to the drawings of FIG. 2 and thereafter.

Figure 2:
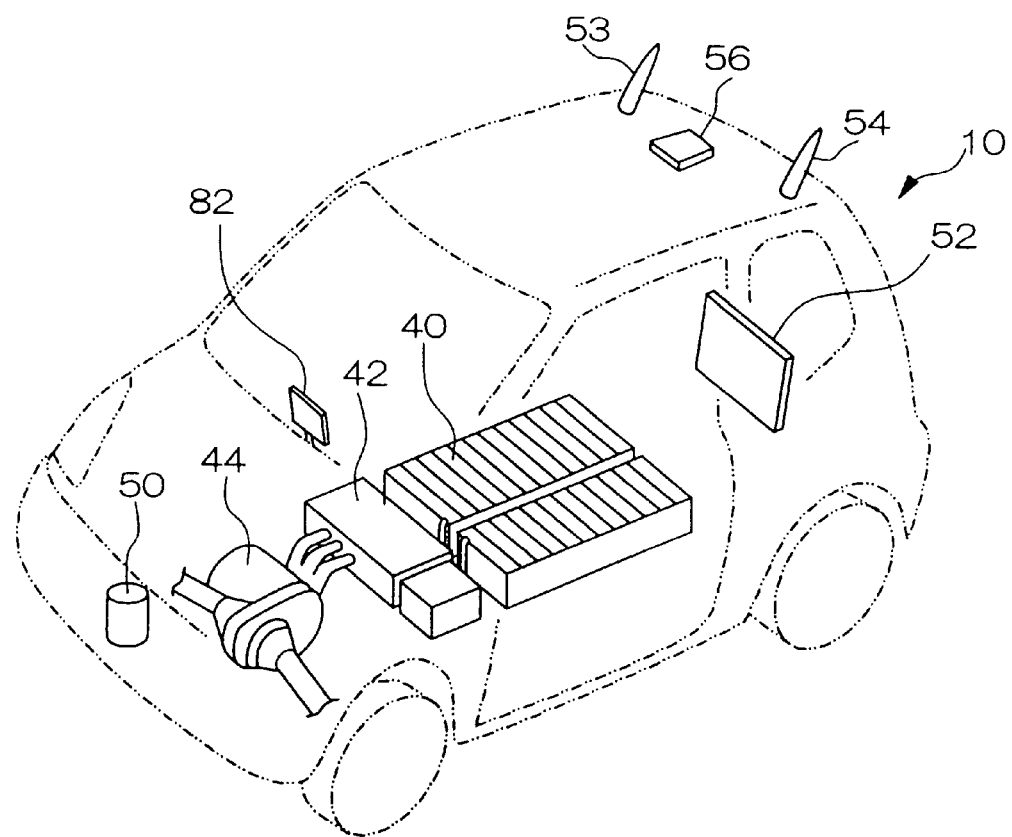
FIG. 2 is a perspective view of an electric vehicle of the embodiment of the present invention.

FIG. 2 shows an electric vehicle 10 capable of travelling in a procession, which is fitted with a laser radar 50 in the center of the front bumper capable of wide angle scanning, and a reflector 52 in the center of the rear bumper, being a plate with a mirror finish for reflecting a radar wave emitted by a laser radar 50 of a succeeding vehicle. By picking up the location of the reflector 52 (radar measuring point) of the preceding vehicle in real time using the laser radar 50 of the succeeding vehicle, it is possible for the succeeding vehicle to detect the location of the preceding vehicle (the distance from the preceding vehicle) and its direction in real time.

Figure 3:
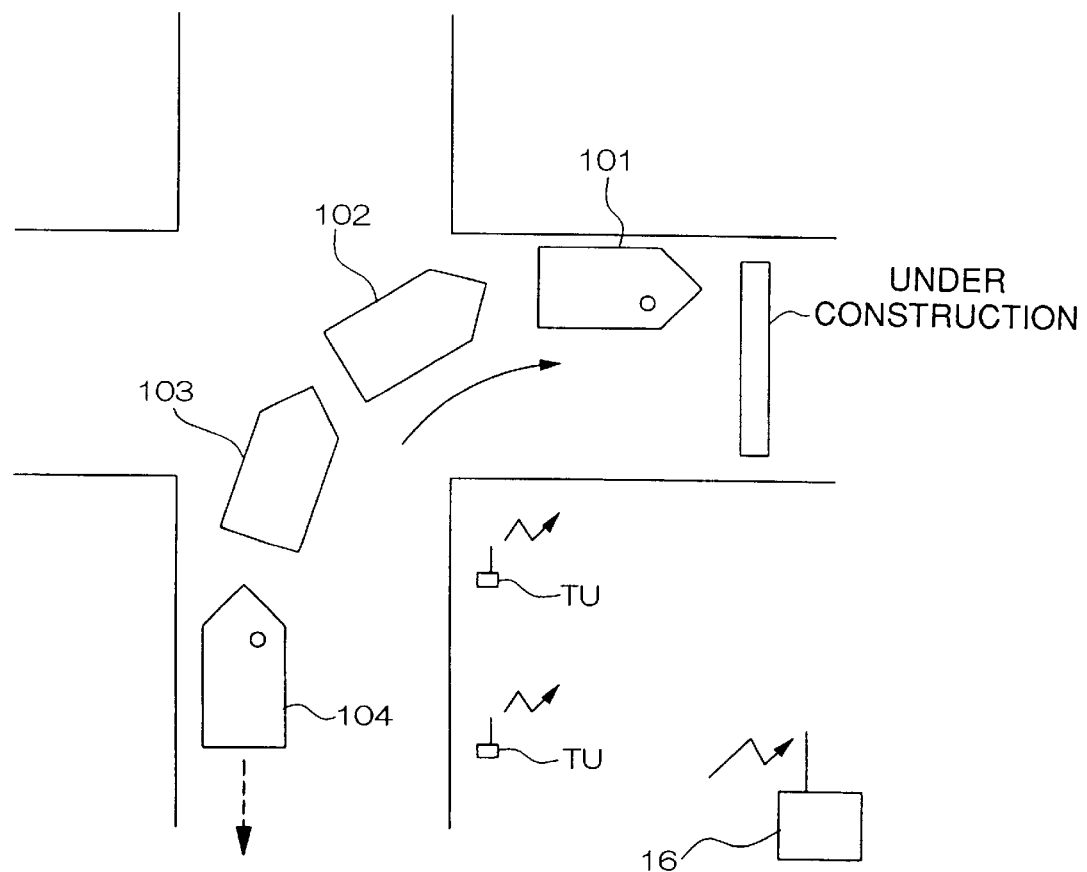
FIG. 3 is a diagram explaining a situation in which an emergency stop is made while travelling in a procession.

In this embodiment, using a combination of the laser radar 50 and the reflector 52, the distance and difference in directions of travel between the succeeding vehicle and the preceding vehicle can be detected. Installed in the roof of the electric vehicle 10 are; a vehicle to vehicle antenna 53 for radio communication between electric vehicles 10 (vehicle to vehicle communication), a road to vehicle antenna 54 for radio communication with communication devices TU and the like arranged along a road as shown in FIG. 3, and a GPS/DGPS antenna 56 for receiving electromagnetic waves from GPS satellites and DGPS stations. Here, 40 is a battery.

FIG. 3 shows the case of entering a path under construction, and FIG. 4 shows the structure of an electric vehicle 10 with structural elements related to processional (column) travel.

Here, among electric vehicles 10 in the travelling procession, an electric vehicle 10 that is driven by a driver and travels at the head is called a leading vehicle, an electric vehicle 10 following the leading vehicle 101 is called a succeeding vehicle 102, and electric vehicles following the succeeding vehicle 102 are called a succeeding vehicle 103 and a succeeding vehicle 104.

Furthermore, the succeeding vehicle 104 has a driver as well as the leading vehicle 101. The occupant of the last succeeding vehicle 104 is, in the first embodiment, an operator for ensuring safety while travelling, and, in the second embodiment, when the leading vehicle 101 has to reverse because of an obstacle or having entered a road under construction, becomes a driver for reverse processional travel with the last vehicle being a temporary leading vehicle. Here, the operator may enter the other succeeding vehicles 102 or 103. Furthermore, the number of vehicles in the procession is not limited to four, and provided there is no problem when travelling between ports, then two, three, five or more vehicles may be possible.

Here, in FIG. 4 each of the leading vehicle 101, the succeeding vehicles 102, 103 and 104 (the succeeding vehicle 104 is not shown in the figure) has the same specification (the same structure) and is of the same type as the electric vehicle 10. The structures of the parts within the dotted lines of the succeeding vehicles 102 and 103 in the figure are the same as the structures of the parts within the dotted lines of the leading vehicle 101. Electric vehicle 10 can be switched between the manually driven leading vehicle 101 and the automatically operated succeeding vehicles 102 and 103 (including the last vehicle 104 described later).

Furthermore, the electric vehicle 10 has a travel ECU 60, being a complete control processing device. The travel ECU 60 is connected to a GPS/DGPS positioning device 70 for measuring the current location of the vehicle (latitude and longitude), a distance sensor 72 for detecting the traveled distance to calculate the driving speed and the like, a direction sensor 74 for detecting the direction of the vehicle, an acceleration sensor 76 for detecting control torque, being the operating amount of a motor 44 corresponding to the opening of the accelerator, a brake sensor 78 for detecting the brake oil pressure, being the operating amount of the brake, a steering sensor 80 for detecting the steering angle, being the operating amount of the steering, and the aforementioned laser radar 50.

Here, the above-mentioned GPS/DGPS positioning device 70 is not used for driving control during processional travel since the accuracy of detecting the location, which is around one meter, is low. However, it is used as a sensor 16 shown in FIG. 3 to determine in which part of the available area a procession is located, and for displaying the vehicle location on a map on a display device 82 comprising a navigation device with a speaker 81 for audible guidance and the like.

The travel ECU 60, according to the control torque detected by the acceleration sensor 76, controls the rotation of the motor 44 via a driving power control ECU 42. Furthermore, the travel ECU 60, according to the brake oil pressure detected by the brake sensor 78, controls the braking force of the brake actuator 86 via a braking force control ECU 84. Moreover, the travel ECU 60, according to the steering detected by the steering sensor 80, controls the steering actuator 90 via a steering control ECU 88. Numeral 92 in FIG. 4 denotes a vehicle to vehicle radio unit.

The electric vehicle 10 with this structure forms a procession by receiving information from a controlling device in a port (not shown in the Figure) to travel forward in a procession toward a target port (in the direction of the solid arrow lines) as shown in FIG. 3. During processional travel, for example, if a situation occurs where the occupant of the succeeding vehicle 104 requires an emergency stop for any reason and the procession must be cancelled, being away from a port, an instruction from the control device in the port cannot be received. Hence this causes an inconvenience in that cancellation of the procession and new procession formation are not possible.

Therefore, in the first embodiment, procession cancellation and new procession formation can be performed by each electric vehicle 10. That is to say, in order to cancel a procession or the like, the display device 82 is provided with an input function for supporting travel in a procession so that a driver can perform manual operations for procession formation and the like based on instructions issued from the control device in the port. Here, the display device 82 is normally used as a display for car navigation as mentioned above.

To be specific, the input function is provided with an emergency countermeasure input function as described later, including an input function for forming a procession outside a port (normally performed in a port by transmissions from the control apparatus).

Next is a description of the display modes of the display device 82 in the first embodiment based on FIGS. 5 and 6.

FIG. 5 shows the display modes of the display device 82 in the leading vehicle 101. FIG. 5(a) shows a procession setting screen. As the Figure shows, the arrangement is such that the total number of vehicles and the sequence number of each vehicle can be entered using a total number button DB and a current vehicle sequence number button JB. Here, the part shown by a large square is an outline of the navigation screen, and the small squares and circle drawn below and to the side of the navigation screen are the navigation setting switches. Here, each button is shown on the screen (hereunder the same).

FIG. 5B shows the screen during procession formation. In this display, setting of the leading vehicle has been completed and communication from the succeeding vehicle is being awaited. A procession cancel button TB is displayed on the screen. FIG. 5C shows the screen during processional travel. It displays that processional travel is being performed and that for cancellation of the procession, the parking lock is to be engaged and the procession cancel button pressed. The procession cancel button TB is displayed on the screen.

FIG. 6 shows the display modes of the display device 82 in the succeeding vehicles 102, 103 and 104. FIG. 6A shows a procession setting screen. As is shown in the FIG. 6A, the arrangement is such that the total number of vehicles and the current vehicle's sequence number can be entered by a total number button DB and a current vehicle sequence number button JB. FIG. 6B shows a screen during procession formation and travel. It displays that the current vehicle has been set as a succeeding vehicle, and that automatic travel will start when communication is established with the leading vehicle. The screen displays an emergency stop button KB.

Here, when a succeeding vehicle requests an emergency stop for any reason using the emergency stop button, the other succeeding vehicles immediately stop automatically by braking and the like. At this time, the leading vehicle obtains information about the emergency stop, however, the decision to stop is left to the driver's judgement. Accordingly, the safety of each succeeding vehicle 102, 103 and 104 can be assured.

Here, in this embodiment, since there is also a driver in the last vehicle, it is the driver of the last vehicle 104 who presses the emergency stop button KB. However, as previously mentioned, in the case when each of the succeeding vehicles 102, 103 and 104 has an occupant, all the succeeding vehicles 102, 103 and 104 have the possibility of pressing the button.

Next is a description of a flow chart in the case in which the leading vehicle and the last vehicle have an occupant and that only forward processional travel is possible, in accordance with FIG. 7 through FIG. 10.

FIG. 7 shows the main flowchart.

In step S10, it is judged whether procession mode is set. In step S10, when judged that procession mode is not set, control proceeds to step S11, the display device 82 displays the usual navigation display, and control proceeds to step S12. Then, in step S12, it is judged whether the procession mode request switch is ON. In step S12, when judged that the procession mode request switch is "OFF", control terminates. In step S12, when judged that the procession mode request switch is "ON", control proceeds to step S13, which switches to procession mode and then control terminates.

In step S10, when judged that procession mode is set, control proceeds to step S14, and it is judged whether procession formation is finished. When the judgement result is "YES", that is to say, the procession formation is finished, control proceeds to step S15, and it is judged whether the current vehicle sequence number is for a leading vehicle. In step S15, when judged to be a leading vehicle, control proceeds to step S17, and leading vehicle processing is performed as described later. In step S15, when judged that the current vehicle sequence number is not a leading vehicle, control proceeds to step S16, and here succeeding vehicle processing is performed as described later.

In step S14, when judged that procession formation is not finished, control proceeds to step S18, and here it is judged whether procession mode is set. In step S18, when judged that procession mode is set, control proceeds to step S19 and procession formation processing is performed as described later. In step S18, when judged that procession mode is not set, control proceeds to step S20 and the display device 82 shows the procession setting screen (refer to FIG. 5A and FIG. 6A). In step S21 the total number of vehicles is entered (by operating the total number button DB (hereunder the same)). Then in step S22 the current vehicle sequence is entered (by operating the current vehicle sequence number button JB (hereunder the same)), and in step S23 control switches to procession formation mode, and processing terminates.

Here, during data entry, it may be arranged that by entering the vehicle number of each electric vehicle 10 in order, the total number of vehicles and the current vehicle sequence number are entered by implication. For example, in the case when the numbers of the electric vehicles 10 are 21, 22, 23 and 24, and the current vehicle is No. 24, if the input order is "22", "23", "21" and "24", the total number of vehicles is four, and the current vehicle is the last of the succeeding vehicles. Here, this flowchart operates every 10 msec, for example.

Figure 8:
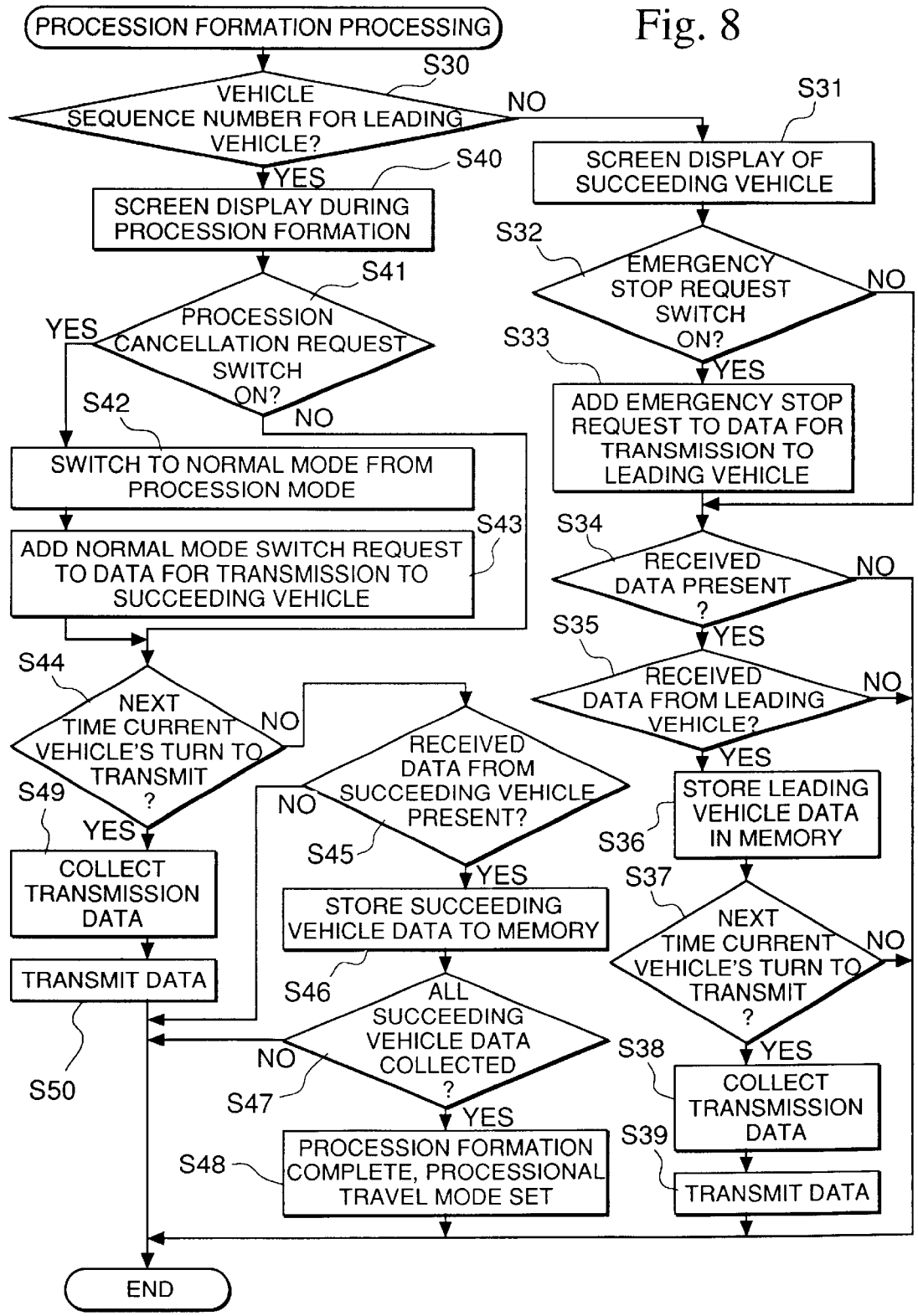
FIG. 8 is a flowchart showing the procession formation processing in a case of normal travelling.

Next is a description of the procession formation processing in step S19 in FIG. 7, in accordance with the flowchart in FIG. 8.

First, in step S30 it is judged whether the current vehicle sequence number is for a leading vehicle. In step S30, when judged that the current vehicle sequence number is not for a leading vehicle, control proceeds to step S31, and the screen shows the display for a succeeding vehicle on the display device 82. Then, in step S32 it is judged whether the emergency stop request switch (corresponding to the emergency stop button KG (hereunder the same)) is ON.

In step S32, when the judgement result is "NO", that is, when it is judged that the emergency stop indicating switch is "OFF", control proceeds to step S34. In step S32, when the judgement result is "YES", that is to say, the emergency stop request switch is "ON", then in step S33, the emergency stop request is added to the data for transmission to the leading vehicle, and control proceeds to step S34. In step S34 the presence of received data is detected. In step S34, when there is no received data, that is to say, the judgement result is "NO", control terminates. In step S34, when the judgement result is "YES", then in step S35 it is judged whether the received data was transmitted from the leading vehicle.

In step S35, when judged that the received data was not transmitted from the leading vehicle, control terminates. In step S35, when judged that the received data was transmitted from the leading vehicle, then in step S36, the data transmitted from the leading vehicle is stored in memory, and control proceeds to step S37. In the next step, S37, it is judged whether the next time is the current vehicle's turn to transmit. When the judgement result is "NO", control terminates. When the judgement result is "YES", that is to say, it is judged that the next time is the current vehicle's turn to transmit, the data for transmission is collected in step S38, the data is transmitted in step S39, and control terminates.

In step S30, when the result of judging whether the current vehicle sequence number is for a leading vehicle is "YES", that is to say, when judged that the current vehicle is a leading vehicle, then in step S40 the display during procession formation is shown on the display device 82, and control proceeds to step S41. Next, in step S41 it is judged whether the procession cancel request switch (corresponding to the procession cancel button TB (hereunder the same)) is ON. If the judgement result in step S41 is "YES", that is to say, when judged that the procession cancel request switch is "ON", control proceeds to step S42, and switches from procession mode to normal mode. Furthermore, in step S43 a request to switch to normal mode is added to the data for transmission to the succeeding vehicles. Then control proceeds to step S44.

When the judgement result in step S41 is "NO", that is to say, when judged that the procession cancel request switch is "OFF", control proceeds to step S44. In step S44 it is judged whether the next time is the current vehicle's turn to transmit. When the judgement result in step S44 is "YES", then in step S49 the data for transmission is collected, in step S50 the data is transmitted, and control terminates. When the judgement result in step S44 is "NO", control proceeds to step S45, and it is judged whether there is any received data from the succeeding vehicles.

In step S45, when judged that there is no received data, control terminates. In step S45, when judged that there are received data, then in step S46 the data from the succeeding vehicles are stored in memory, and in step S47 it is judged whether all the data of the succeeding vehicles are present.

In step S47, when judged that not all the data of the succeeding vehicles are present, control terminates. In step S47, when judged that all the data of the succeeding vehicles are present, control proceeds to step S48. Here procession formation is complete, processional travel mode is set, and control terminates.

Figure 9:
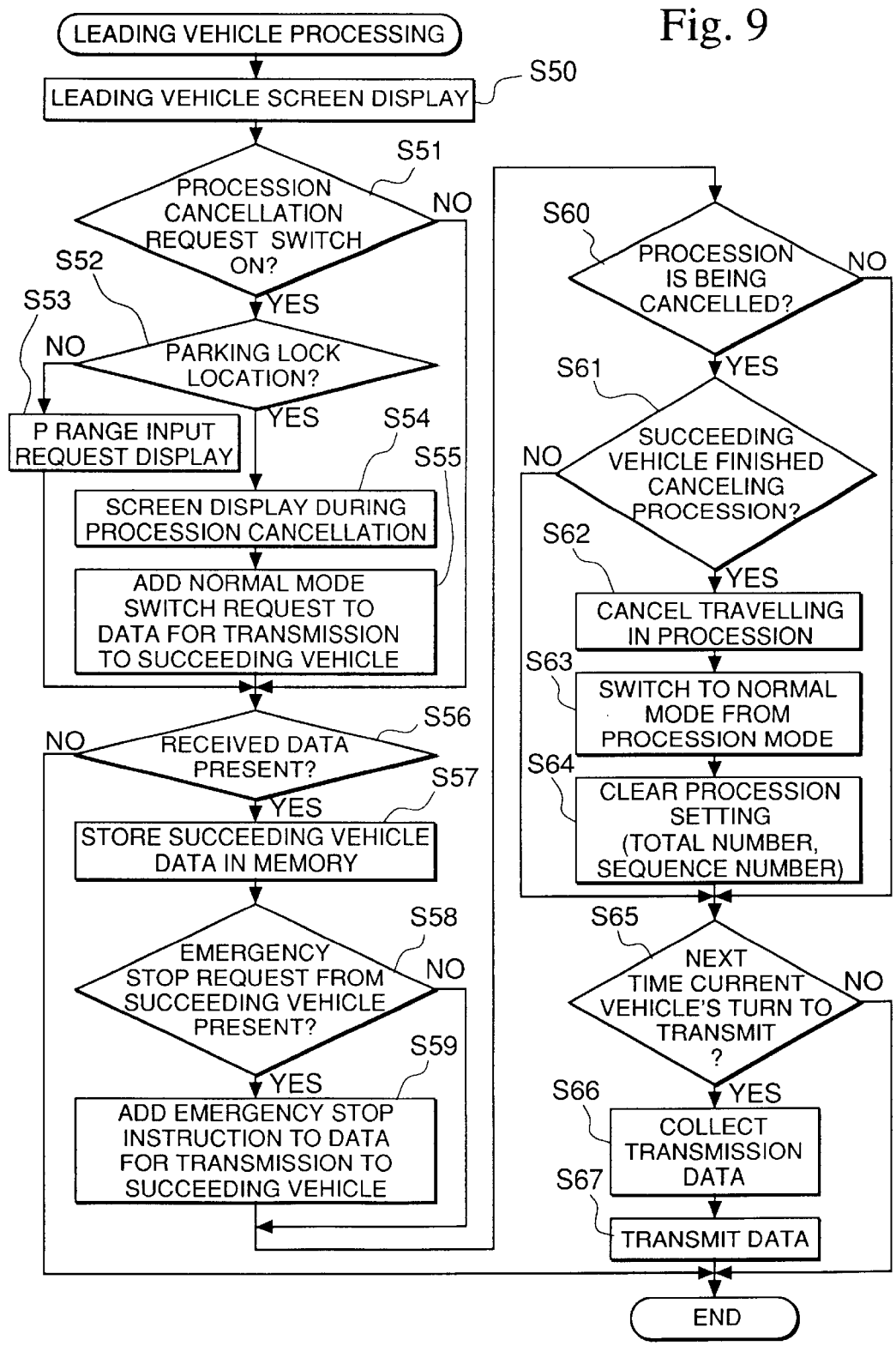
FIG. 9 is a flowchart showing the leading vehicle processing in a case of normal travelling.

Next is a description of the flowchart of the leading vehicle processing in step S17 in FIG. 7, in accordance with FIG. 9.

In step S50 the screen of a leading vehicle is displayed on the display device 82, and control proceeds to step S51. In step S51 it is judged whether the procession cancel request switch is ON. When the judgement result in step S51 is "NO", that is to say, when judged that the procession cancel request switch is "OFF", control proceeds to step S56.

When the judgement result in step S51 is "YES", that is to say, when judged that the procession cancel request switch is "ON", then in the next step S52 it is judged whether the shift position is in the parking lock location. When the judgement result in step S52 is "NO", that is to say, when judged that the shift position is not in the parking lock location (parking range), then in step S53 the P (parking) range input request display is displayed on the display device 82, and control proceeds to step S56. When the judgement result in step S52 is "YES", that is to say, when judged that the shift position is in the parking lock location, then in the next step S54, the procession canceling display is displayed on the display device 82. Then in step S55 a request to switch to normal mode is added to the data for transmission to the succeeding vehicles, and control then proceeds to step S56.

In step S56 it is judged whether there is any received data. In step S56, when judged that there is no received data, control terminates. In step S56, when judged that there is received data, then in step S57 the data of the succeeding vehicles are stored in memory, and control proceeds to step S58. In step S58 it is judged whether there is an emergency stop request from the succeeding vehicles. As a result of the judgement in step S58, when judged that there is no emergency stop request from the succeeding vehicles, control proceeds to step S60. As a result of the judgement in step S58, when judged that there is an emergency stop request from the succeeding vehicles, control proceeds to step S59, and the emergency stop instruction is added to the data for transmission to the succeeding vehicles. Then control proceeds to step S60.

Next, in step S60 it is judged whether the procession is being cancelled. When the judgement result in step S60 is "NO", control proceeds to step S65. When the judgement result in step S60 is "YES", that is to say, when judged that the procession is being cancelled, control proceeds to step S61, and it is judged whether the procession cancellation of the succeeding vehicles is finished. In step S61, when judged that the procession cancellation of the succeeding vehicles is not finished, control proceeds to S65.

On the other hand, in step S61, when judged that the procession cancellation of the succeeding vehicles is finished, then in step S62 processional travel is cancelled, and in step S63 the procession mode is switched to normal mode. Then control proceeds to step S64, and here the procession settings (total number and order of the vehicles) are cleared, and control proceeds to step S65. In step S65 it is judged whether the next time is the current vehicle's turn to transmit. In step S65, when judged that the next time is not the current vehicle's turn to transmit, control terminates. In step S65, when judged that the next time is the current vehicle's turn to transmit, then in step S66 data for transmission is collected in step S66. Then, in step S67 data is transmitted, and control terminates.

Figure 10:
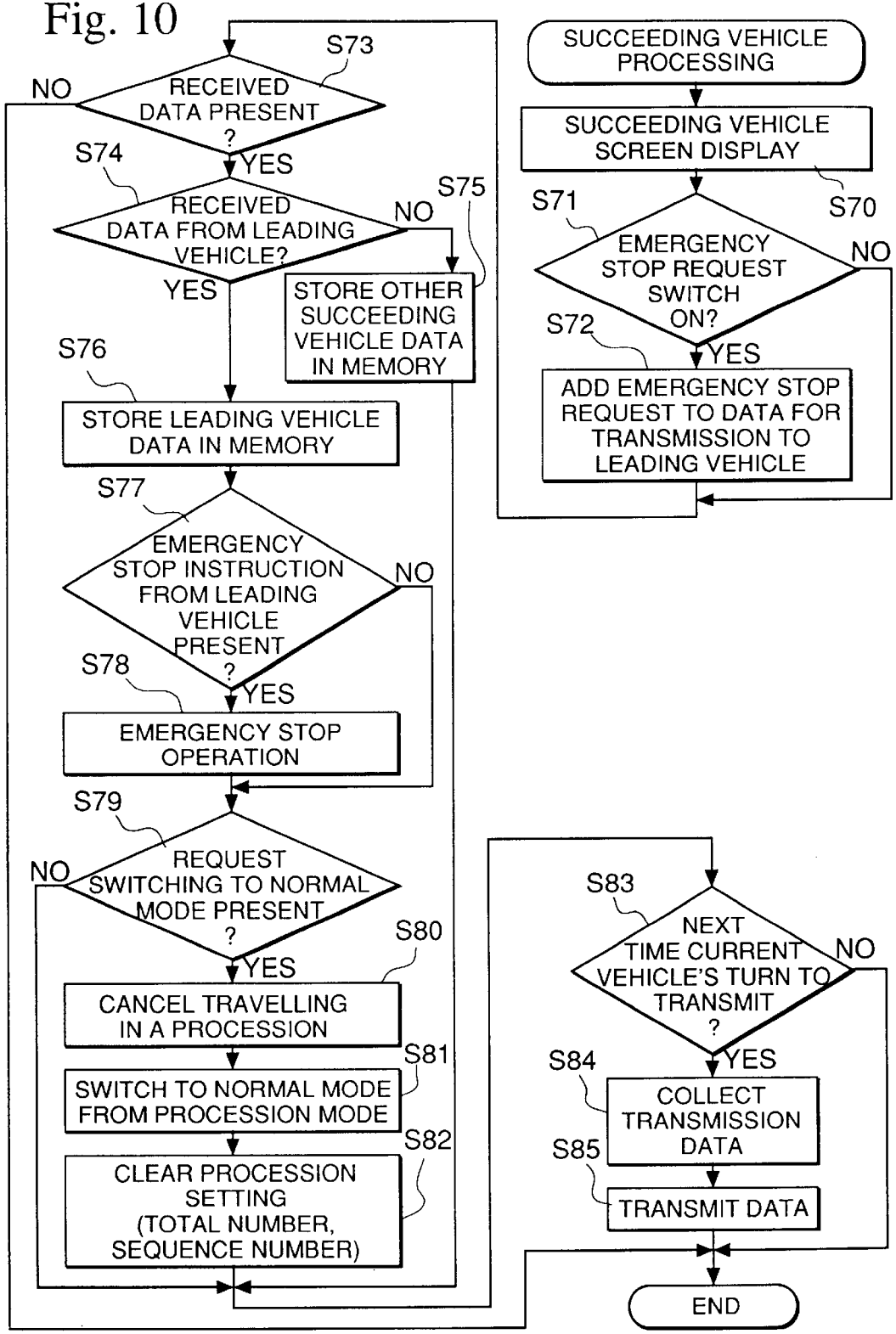
FIG. 10 is a flowchart showing the succeeding vehicle processing in a case of normal travelling.

Next is a description of the succeeding vehicle processing in step S16 of FIG. 7, in accordance with the flowchart of FIG. 10.

In step S70 the screen of a succeeding vehicle is displayed on the display device 82, and control proceeds to step S71. In step S71 it is judged whether the emergency stop request switch is ON. In step S71, when judged that the emergency stop request switch is "OFF", control proceeds to step S73. In step S71, when judged that the emergency stop request switch is "ON", an emergency stop request is added to the data for transmission to the leading vehicle in step S72, and control proceeds to step S73.

In step S73 it is judged whether there is any received data. In step S73, when judged that there is no received data, control terminates. In step S73, when judged that there is received data, control proceeds to step S74, and here it is judged whether the received data are from the leading vehicle. In step S74, when judged that the received data are not from the leading vehicle, then in step S75 the data of the other succeeding vehicles are stored in memory, and control proceeds to step S83.

In step S74, when judged that the received data are from the leading vehicle, then in step S76, the data of the leading vehicle are stored in memory, and control proceeds to step S77. In step S77 it is judged whether there is an emergency stop instruction from the leading vehicle.

In step S77, when judged that there is no emergency stop instruction from the leading vehicle, control proceeds to step S79. When judged that there is an emergency stop instruction from the leading vehicle, then in step S78 an emergency stop operation is performed, and control proceeds to step S79. In step S79 it is judged whether there is a request to switch to normal mode. In step S79, when judged that there is no request to switch to normal mode, control proceeds to step S83. In step S79, when judged that there is a request to switch to normal mode, then in step S80, the processional travel (processional travel mode) is cancelled, and in the next step S81, the procession mode is switched to normal mode. Furthermore, in step S82 the procession settings (total number and order) are cleared, and control proceeds to step S83.

Next, in step S83 it is judged whether the next time is the current vehicle's turn to transmit. When the judgement result in step S83 is "NO", control terminates. When the judgement result in step S83 is "YES", then in step S84 the data for transmission are collected, and in step S85 the data are transmitted and control terminates.

Next is a description of the vehicle to vehicle communication between the leading vehicle 101 and the succeeding vehicles 102, 103 and 104 during processional travel in the case of performing normal (forward travel) processional travel. Here, the vehicle to vehicle communication is performed by the transmission and receiving function when the aforementioned procession setting terminates and each vehicle acknowledges that the total number of vehicles and current vehicle sequence number have been entered.

(1) The leading vehicle 101 transmits, and then passes transmission rights to the succeeding vehicle 102.

Here, the transmitted information from the leading vehicle is transmitted (broadcasted) to all of the succeeding vehicles.

(2) Next, the succeeding vehicle 102 transmits, and then passes transmission rights to the leading vehicle 101.

(3) The leading vehicle 101 transmits again, and then passes transmission rights to the succeeding vehicle 103.

(4) Next, the succeeding vehicle 103 transmits, and then passes transmission rights to the leading vehicle 101.

(5) The leading vehicle 101 transmits again, and then passes transmission rights to the last succeeding vehicle 104.

(6) The succeeding vehicle 104 transmits, and then passes transmission rights to the leading vehicle 101.

(7) The leading vehicle 101 transmits, and then passes transmission rights to the succeeding vehicle 102.

(8) The above procedure is then repeated.

Next is a description of the communication procedure between vehicles in processional travel when an emergency stop request (from the last vehicle 104) is made. Here, the description starts at the time that an emergency stop request is made by the last vehicle 104.

(9) The last succeeding vehicle 104 transmits, and then passes transmission rights to the leading vehicle 101. The transmitted information contains emergency stop request information.

(10) The leading vehicle 101 transmits, and then passes transmission rights to the succeeding vehicle 102. The transmitted information contains emergency stop request information. Here, the transmitted information from the leading vehicle 101 is transmitted (broadcasted) to all of the succeeding vehicles.

(11) Next, the succeeding vehicle 102 transmits, and then passes transmission rights to the leading vehicle 101.

(12) The leading vehicle 101 transmits again, and then passes transmission rights to the succeeding vehicle 103.

(13) Next, the succeeding vehicle 103 transmits, and then passes transmission rights to the leading vehicle 101.

(14) The leading vehicle 101 transmits again, and then passes transmission rights to the succeeding vehicle 104. And at this point, that is to say, on reaching the last succeeding vehicle 104, all of the succeeding vehicles 102, 103 and 104 stop immediately.

Therefore, with the first embodiment, for example, while driving with occupants in the leading vehicle 101 and the succeeding vehicle 104, if any trouble occurs and an emergency stop request is made by the succeeding vehicle 104 by operating the emergency stop button KB, the succeeding vehicles 102 and 103 can stop immediately, enabling the automatically travelling succeeding vehicles to stop safely. As a result, it is possible to perform safe processional travel, with the flexibility to respond to various changeable road conditions.

Here, if an emergency stop request is made by the succeeding vehicle 104, it is the driver's judgement to stop the leading vehicle 101. For example, he can choose not to stop the leading vehicle 101 until it leaves an intersection and the like. In this case, the succeeding vehicles 102, 103 and 104 enter stop mode by the emergency stop.

Furthermore, other than in this kind of emergency stop, after the procession is cancelled, the total number and the current vehicle sequence number can be entered using the display device 82 of each electric vehicle 10. Therefore for example, in a case where one of the vehicles of the procession leaves the procession, or when a vehicle that has left is added to the procession anew, it is possible to rearrange the procession freely outside a port, or to freely insert into the procession an electric vehicle 10 that has left, or to remove a particular electric vehicle 10 from the procession.

Next, the second embodiment will be described.

In this embodiment, the above mentioned electric vehicle 10 receives information from the control apparatus in a port (not shown in the figure), forms a procession and performs processional travel shown in FIG. 3 toward a destination port (solid arrow direction). While performing the processional travel, when turning to right at an intersection as shown in the same figure, a situation may happen such that travelling forward is impossible due to the road being under construction. In this case, being away from the port, instructions from the control apparatus in the port cannot be received, which causes inconveniences in that the procession cannot be cancelled and a new procession cannot be formed.

Accordingly, in the second embodiment, an input function for processional travel support is provided in the display device 82, which enables procession cancellation and new procession formation at each electric vehicle 10. This input function for processional travel support is provided with an input function for forming a procession outside a port (normally performed by transmissions from the control apparatus in a port), and also an input function for reversing the procession (shown by the dotted arrow in FIG. 3) as a countermeasure for emergencies as described later. First, the display mode of the display device 82 will be explained based on FIGS. 11 through 14.

FIG. 11 shows the display modes of the display device 82 of the leading vehicle 101. FIG. 11A shows a procession setting screen. As shown in the figure, the arrangement is such that the total number of vehicles and each vehicle sequence number can be input with the total number button DB and the current vehicle sequence number button JB. FIG. 11B shows the screen during procession formation, which displays that the current vehicle is set as the leading vehicle, and that communication from the succeeding vehicle is being awaited. The screen displays the procession cancel button TB.

FIG. 11C shows a screen during processional travel. It displays that the vehicle is being driven in a procession, that the travel is performed in D range, and that for canceling the procession, the procession cancel button is to be pressed within P range. The screen displays a procession cancel button TB and a leading vehicle abandon button HB. FIG. 11D shows a display mode of the display device 82 in the leading vehicle 101 after the leading vehicle abandon button HB is pressed in the leading vehicle 101 in FIG. 11C. Such situations where the leading vehicle abandons the position are situations such as where the leading vehicle cannot travel forward because of entering, by mistake, a restricted path under construction, or where it cannot travel forward because of obstacles.

This screen displays a confirmation that the vehicle has abandoned being the leading vehicle, and that it will wait until the leading vehicle exchange button is pressed in the last vehicle. The screen displays an emergency stop button KB for a succeeding vehicle. Here, the emergency stop button KB is normally a button for succeeding vehicles, however, the emergency stop button KB is provided since this leading vehicle 101 later becomes the last succeeding vehicle.

FIG. 12 shows the display modes of the display device 82 in the succeeding vehicles 102 and 103 (the last vehicle 104 is omitted). FIG. 12A shows a procession setting screen. As shown in the figure, the total number of vehicles and the current vehicle sequence number can be entered with a total number button DB, and a current vehicle sequence number button JB. FIG. 12B shows a screen during procession formation and travel. It displays that the current vehicle has been set as a succeeding vehicle, and that automatic travel will start when communication is established with the leading vehicle. The screen shows an emergency stop button KB.

Next, FIG. 13 shows the display modes of the display device 82 in the leading vehicle 101 after the leading vehicle 101 abandons its position. FIG. 13A shows the screen when the original leading vehicle 101 is being driven automatically in reverse (reverse travel) with the last vehicle being the leading vehicle (described later). It displays that the last vehicle 104 has been set as the new leading vehicle, and that the accelerator and brake are to be released since automatic driving will be performed. The screen displays an emergency stop button KB. Here, this screen in FIG. 13A is displayed after the last succeeding vehicle 104 becomes the leading vehicle, subsequent to FIG. 11D being displayed on the screen.

Next, FIG. 13B shows the screen when the original leading vehicle 101 reverts to being the leading vehicle. It displays that there is a leading vehicle exchange request from the original last vehicle 104, and that the leading vehicle exchange button is to be pressed. An emergency stop button KB and a leading vehicle exchange button CB are displayed on the screen. After this screen in FIG. 13B is displayed, the screen of the display device 82 in the leading vehicle 101 displays FIG. 11C.

FIG. 14 shows the display modes of the display device 82 in the last vehicle 104. FIG. 14A is the display screen of the last vehicle 104 for setting a procession. As shown in the Figure, at the time of setting, the total number of vehicles and the current vehicle sequence number can be entered with a total number button DB, and a current vehicle sequence number button JB. FIG. 14B shows the screen during procession formation and in the case of travelling as a succeeding vehicle. This screen displays that the vehicle was set as a succeeding vehicle, and that automatic travel will be performed when communication is established with the leading vehicle. The screen displays an emergency stop button KB.

Figure 14A:
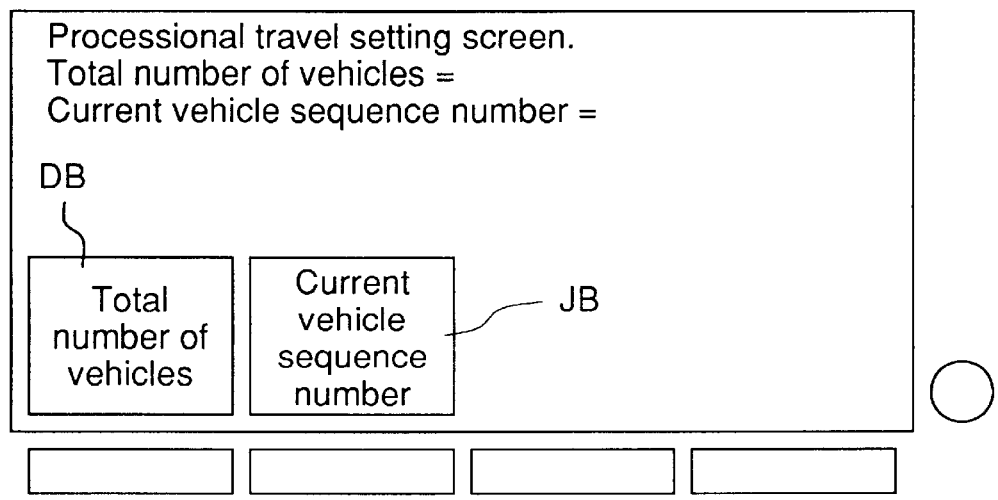
FIGS. 14A, 14B, 14C and 14D are diagrams explaining the display content of the display device in the last vehicle in a case where a forward travelling procession and a reverse travelling procession are possible: 14A is a screen for procession setting; 14B is a screen during procession formation and travelling as a succeeding vehicle; 14C is a screen received after the leading vehicle abandons the position as the leading vehicle; 14D is a screen for the leading vehicle exchange declaration.
Figure 14B:
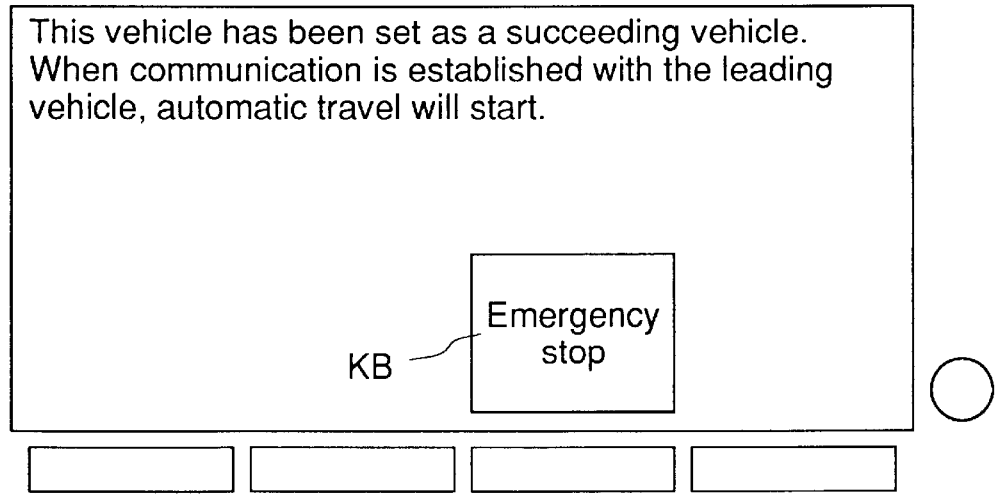
Figure 14C:
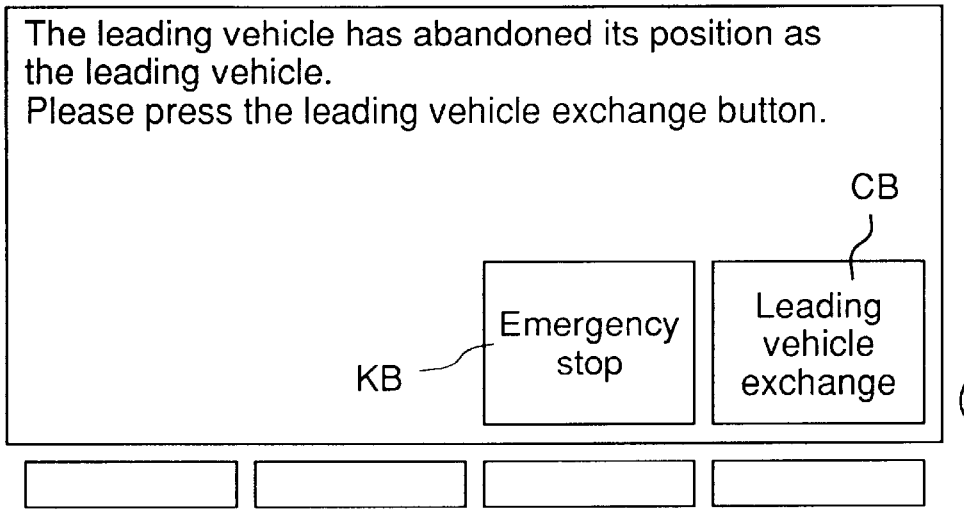

Furthermore, FIG. 14C shows the screen when a leading vehicle abandon message is received after the leading vehicle 101 stops and abandons its position as the leading vehicle. It displays that the leading vehicle 101 has abandoned its position as the leading vehicle, and that the leading vehicle exchange button is to be pressed. The screen displays an emergency stop button KB and a leading vehicle exchange button CB.

Figure 14D:
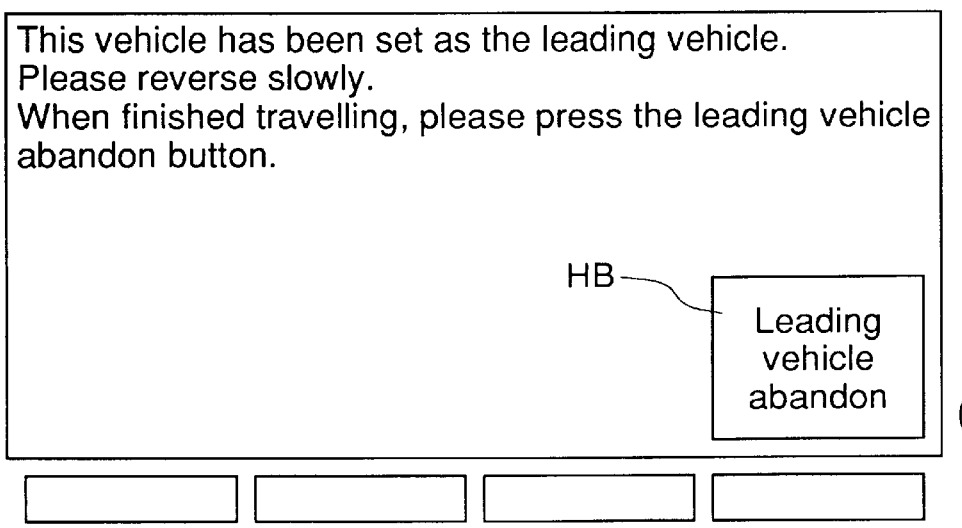

FIG. 14D shows the screen of the leading vehicle exchange declaration. It displays that the vehicle is set as the new leading vehicle, and reverse travel is to be performed slowly with the shift lever being in the R range. Furthermore, it displays that the leading vehicle abandon button HB is to be pressed after the reverse travel is finished. After this display of FIG. 14D, when the leading vehicle abandon button HB is pressed, the screen displays FIG. 14B.

Figure 15:
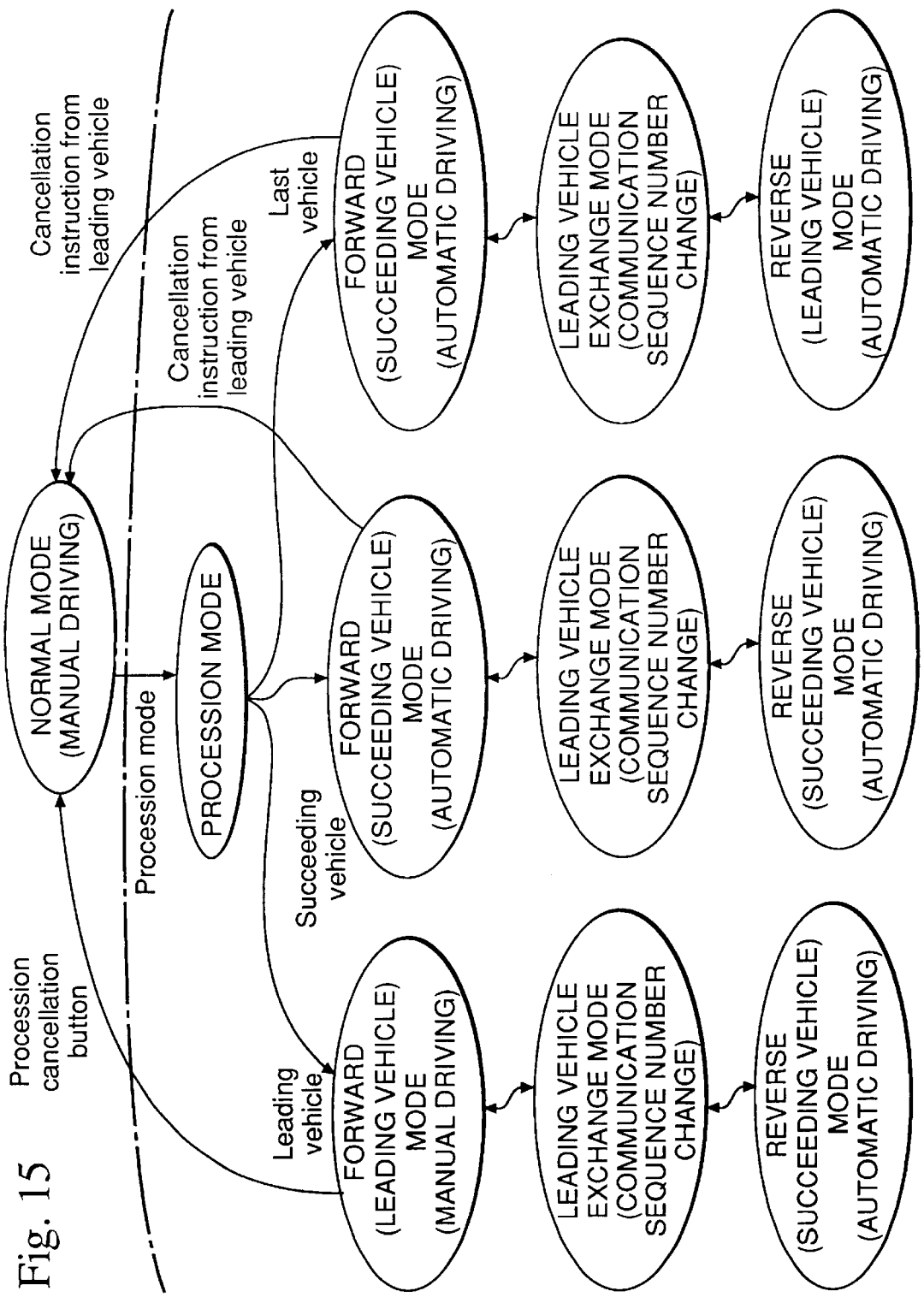
FIG. 15 is a diagram explaining the switching of the control modes in a case where a forward travelling procession and a reverse travelling procession are possible.

FIG. 15 shows the transition of control modes when, with an occupant also being in the last vehicle, forward travel in procession and reverse travel in procession can be performed. To be specific, the transitions between two kinds of procession modes, a mode where the leading vehicle 101 performs only forward travel in a procession, and a mode where reverse travel in a procession is performed with the last vehicle 104 being the new leading vehicle 104 after the original leading vehicle 101 abandons its position, are shown with a case of normal manual driving. In FIG. 3, a case of four vehicles in processional travel is explained as an example, however in FIG. 15, on account of limited space, a case of three vehicles in processional travel is explained.

In the Figure, when switched to the procession setting mode from the normal mode of manual driving for each vehicle, there are three patterns that may be selected in the procession mode. The first pattern is a forward processional travel mode shown below the procession setting mode, aligned side by side. In this procession mode, the leading vehicle described on the left side is driven manually in a forward (leading vehicle) mode, and the last vehicle on the right side is driven automatically in a forward (succeeding vehicle) mode. The succeeding vehicle in the center is also driven automatically in the forward (succeeding vehicle) mode.

Next, in a situation where the leading vehicle has to reverse, the leading vehicle, the last vehicle and the succeeding vehicles enter the second pattern, the leading vehicle exchange mode as well as changing communication order. These modes are shown below the forward processional travel modes, aligned side by side.

Then, after this leading vehicle exchange mode is the third pattern, a reverse processional travel mode. The reverse processional travel mode is for performing processional travel in reverse with the leading vehicle being the new last vehicle, and the original last vehicle being the new leading vehicle.

As shown in the Figure, in the reverse processional travel mode a new leading vehicle, being the original last vehicle, is driven manually in the reverse (leading vehicle) mode, the original leading vehicle, being the new last vehicle, is driven automatically in the reverse (succeeding vehicle) mode, and the succeeding vehicle is driven automatically in the reverse (succeeding vehicle) mode. Here, the leading vehicle switches to the normal mode from the forward processional travel mode, the leading vehicle exchange mode or the reverse processional travel mode, by its procession cancel button being operated, while the succeeding vehicles do so by the procession cancellation instruction from the leading vehicle.

Figure 16:
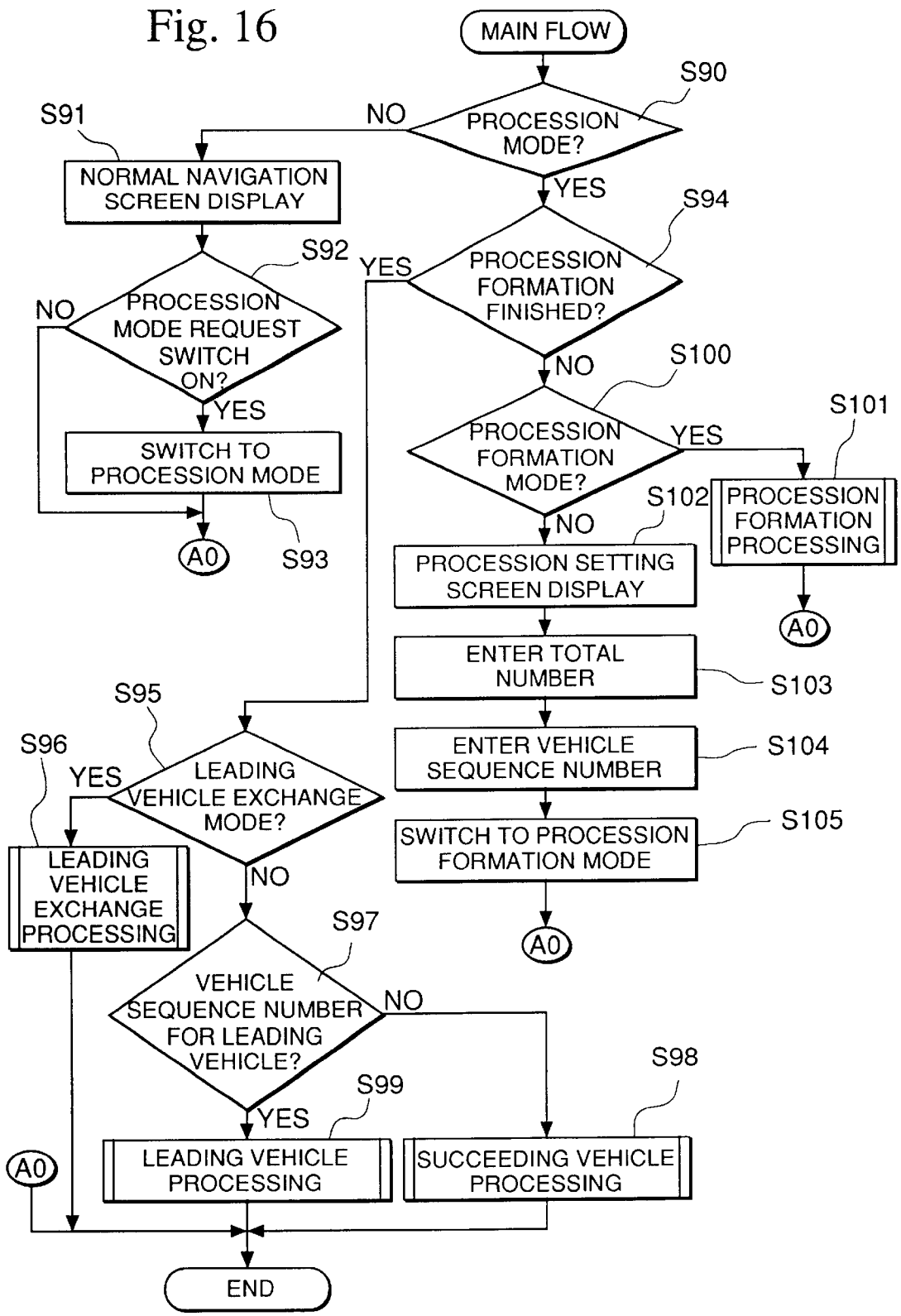
FIG. 16 is the main flowchart in a case where a forward travelling procession and a reverse travelling procession are possible in the second embodiment.

Next is a description of a flowchart in a situation where reverse travel in procession by the last vehicle is possible with occupants being in at least the leading vehicle and the last vehicle, in accordance with FIG. 16 through FIG. 21. FIG. 16 shows the main flowchart.

In step S90 it is judged whether the procession mode is set. In step S90, when judged that the procession mode is not set, control proceeds to step S91, the display device 82 shows the normal navigation display, and control proceeds to step S92.

Then, in step S92 it is judged whether the procession mode request switch is ON. In step S92, when judged that the procession mode request switch is "OFF", control terminates. In step S92, when judged that the procession mode request switch is "ON", control proceeds to step S93, switches to procession mode, and terminates.

In step S90, when judged that the procession mode is set, control proceeds to step S94, and judges whether procession formation is finished. When the judgement result is "YES", that is to say, when judged that the procession formation is finished, control proceeds to step S95, and judges whether the leading vehicle exchange mode is set. In step S95, when judged that the leading vehicle exchange mode is set, control proceeds to step S96, and leading vehicle exchange processing described later is performed. In step S95, when judged that the leading vehicle exchange mode is not set, control proceeds to step S97, and here judges whether the current vehicle sequence number is for the leading vehicle. As a result of the judgement in step S97, when judged that the current vehicle sequence number is for the leading vehicle, leading vehicle processing described later is performed in step S99, and control terminates. As a result of the judgement in step S97, when judged that the current vehicle's sequence number is not for the leading vehicle, succeeding vehicle processing described later is performed in step S98, and control terminates.

In step S94, when judged that the procession formation is not finished, control proceeds to step S100, and here judges whether the procession formation mode is set. In step S100, when judged that the procession formation mode is set, control proceeds to step S101, procession formation processing is performed, and control terminates. In step S100, when judged that the procession formation mode is not set, control proceeds to step S102 and the screen of the display device 82 displays the procession settings. In step S103 the number of vehicles is entered, then in step S104 the current vehicle's sequence number is entered. In step S105 control switches to the procession formation mode and terminates. Here, this flowchart operates for example every 10 msec, similarly to the aforementioned flowchart in FIG. 7.

Figure 17:
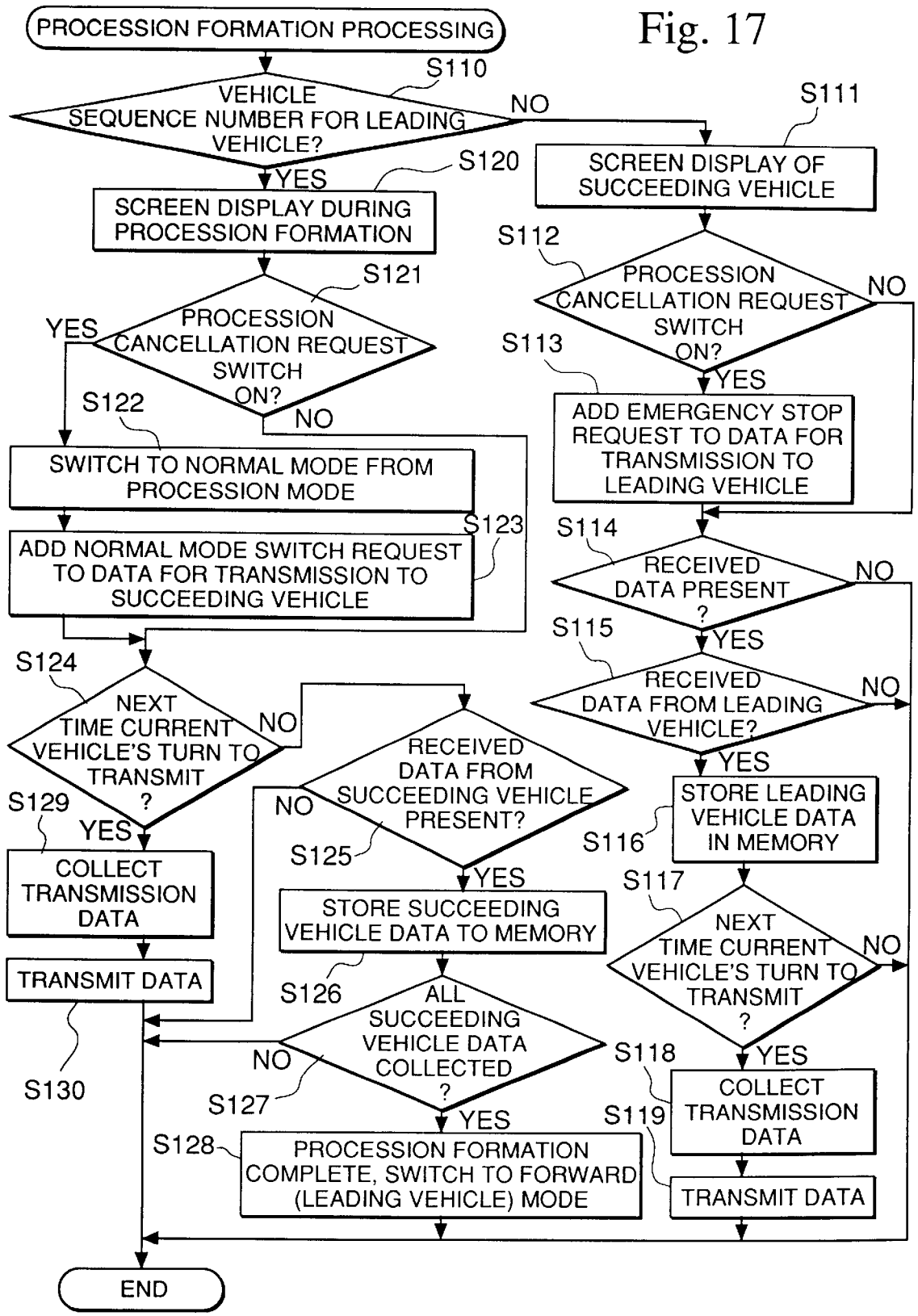
FIG. 17 is a flowchart showing procession formation processing in a case where a forward travelling procession and a reverse travelling procession are possible.

Next is a description of the procession formation processing in step S101 in FIG. 16, in accordance with the flowchart in FIG. 17.

First, in step S110 it is judged whether the current vehicle sequence number is for a leading vehicle. In step S110, when judged that the current vehicle sequence number is not for a leading vehicle, control proceeds to step S111, and the screen shows the display for a succeeding vehicle on the display device 82. Then, in step S112 it is judged whether the emergency stop request switch is ON.

In step S112, when the judgement result is "NO", that is to say, the emergency stop request switch is "OFF", control proceeds to step S114. In step S112, when the judgement result is "YES", that is to say, the emergency stop request switch has been pressed, then in step S113, the emergency stop request is added to the data for transmission to the leading vehicle, and control proceeds to step S114. In step S114 the presence of received data is detected. In step S114, when there is no received data, that is to say, the judgement result is "NO", control terminates. In step S114, when the judgement result is "YES", then in step S115 it is judged whether the received data was transmitted from the leading vehicle.

In step S115, when judged that the received data was not transmitted from the leading vehicle, control terminates. In step S115, when judged that the received data was transmitted from the leading vehicle, then in step S116, the data transmitted from the leading vehicle is stored in memory, and control proceeds to step S117. In the next step, S117, it is judged whether the next time is the current vehicle's turn to transmit. When the judgement result is "NO", control terminates. When the judgement result is "YES", that is to say, it is judged that the next time is the current vehicle's turn to transmit, the data for transmission is collected in step S118, the data is transmitted in step S119, and control terminates.

In step S110, when the result of judging whether the current vehicle sequence number is for a leading vehicle is "YES", that is to say, when judged that the current vehicle is a leading vehicle, then in step S120 the display during procession formation is shown on the display device 82, and control proceeds to step S121. In step S121 it is judged whether the procession cancel request switch is ON. If the judgement result in step S121 is "YES", that is to say, when judged that the procession cancel request switch is "ON", control proceeds to step S122, and switches from procession mode to normal mode. Furthermore, in step S123 a request to switch to normal mode is added to the data for transmission to the succeeding vehicles. Then control proceeds to step S124.

When the judgement result in step S121 is "NO", that is to say, when judged that the procession cancel request switch is "OFF", control proceeds to step S124. In step S124 it is judged whether the next time is the current vehicle's turn to transmit. When the judgement result in step S124 is "YES", then in step S129 the data for transmission is collected, in step S130 the data is transmitted, and control terminates. When the judgement result in step S124 is "NO", control proceeds to step S125, and it is judged whether there is any received data from the succeeding vehicles.

In step S125, when judged that there is no received data, control terminates. In step S125, when judged that there are received data, then in step S126 the data from the succeeding vehicle are stored in memory, and in step S127 it is judged whether all the data of the succeeding vehicles are present.

In step S127, when judged that not all the data of the succeeding vehicles are present, control terminates. In step S127, when judged that all the data of the succeeding vehicles are present, control proceeds to step S128. Here procession formation is complete, switching is to the forward (leading vehicle) mode, and control terminates.

Figure 18:
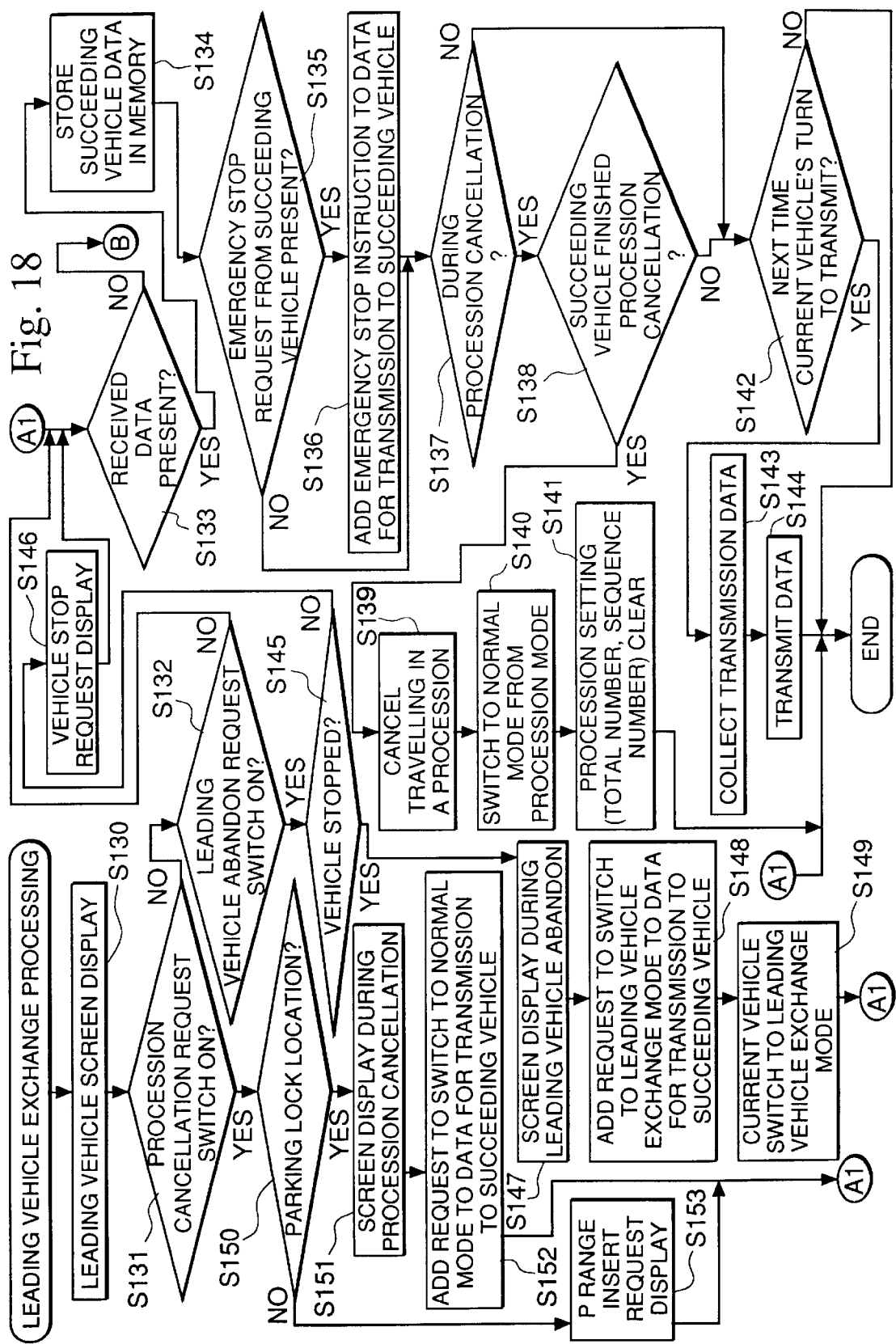
FIG. 18 is a flowchart showing leading vehicle processing in a case where a forward travelling procession and a reverse travelling procession are possible.

Next is a description of the leading vehicle processing in step S99 in FIG. 16, in accordance with the flowchart of FIG. 18.

In step S130 the screen of a leading vehicle is displayed on the display device 82, and control proceeds to step S131. In step S131 it is judged whether the procession cancel request switch is ON. When the judgement result in step S131 is "NO", that is to say, when judged that the procession cancel request switch is "OFF", control proceeds to step S132.

When the judgement result in step S131 is "YES", that is to say, when judged that the procession cancel request switch is "ON", then in the next step S150 it is judged whether the shift position is in the parking lock location. When the judgement result in step S150 is "NO", that is to say, when judged that the shift position is not in the parking lock location (parking range), then in step S153 the P (parking) range input request display is displayed on the display device 82, and control proceeds to step S133. When the judgement result in step S150 is "YES", that is to say, when judged that the shift position is in the parking lock location, then in the next step S151, the procession canceling display is displayed on the display device 82. Then in step S152 a request to switch to normal mode is added to the data for transmission to the succeeding vehicles, and control then proceeds to step S133.

In the before mentioned step S132, it is judged whether the leading vehicle abandon request switch (corresponding to the leading vehicle abandon button HB (hereunder the same)) is ON. As a result of the judgement in step S132, when judged that the leading vehicle abandon switch is "OFF", control proceeds to step S133. As a result of the judgement in step S132, when judged that the leading vehicle abandon switch is "ON", control proceeds to step S145. Here it is judged if the vehicle is stopped. This judgement is performed using the vehicle speed sensor or the like.

As a result of the judgement in step S145, when judged that the vehicle is not stopped, then in step S146 a vehicle stop request is displayed, and control proceeds to step S133. As a result of the judgement in step S145, when Judged that the vehicle is stopped, control proceeds to step S147, and the screen for display during leading vehicle abandonment is displayed. Control then proceeds to step S148 and a request to switch to the leading vehicle exchange mode is added to the data for transmission to the succeeding vehicles. Then, in the next step S149 the current vehicle is also switched to the leading vehicle exchange mode, and control proceeds to step S133.

In step S133 it is judged whether there is any received data. In step S133, when judged that there is no received data, control terminates. In step S133, when judged that there is received data, then in step S134 the data of the succeeding vehicles are stored in memory, and control proceeds to step S135. In step S135 it is judged whether there is an emergency stop request from the succeeding vehicles. As a result of the judgement in step S135, when judged that there is no emergency stop request from the succeeding vehicles, control proceeds to step S137. As a result of the judgement in step S135, when judged that there is an emergency stop request from the succeeding vehicles, control proceeds to step S136, and the emergency stop instruction is added to the data for transmission to the succeeding vehicles. Then control proceeds to step S137.

Next, in step S137 it is judged whether the procession is being cancelled. When the judgement result in step S137 is "NO", control proceeds to step S142. When the judgement result in step S137 is "YES", that is to say, when judged that the procession is being cancelled, control proceeds to step S138, and it is judged whether the procession cancellation of the succeeding vehicles is finished. In step S138, when judged that the procession cancellation of the succeeding vehicles is not finished, control proceeds to S142.

On the other hand, in step S138, when judged that the procession cancellation of the succeeding vehicles is finished, then in step S139 processional travel is cancelled, and in step S100 the procession mode is switched to normal mode. Then control proceeds to step S141, and here the procession settings (total number and order of the vehicles) are cleared, and control terminates. In step S142 it is judged whether the next time is the current vehicle's turn to transmit. In step S142, when judged that the next time is not the current vehicle's turn to transmit, control terminates. In step S142, when judged that the next time is the current vehicle's turn to transmit, then in step S143 data for transmission is collected. Then, in step S144 data is transmitted, and control terminates.

Figure 19:
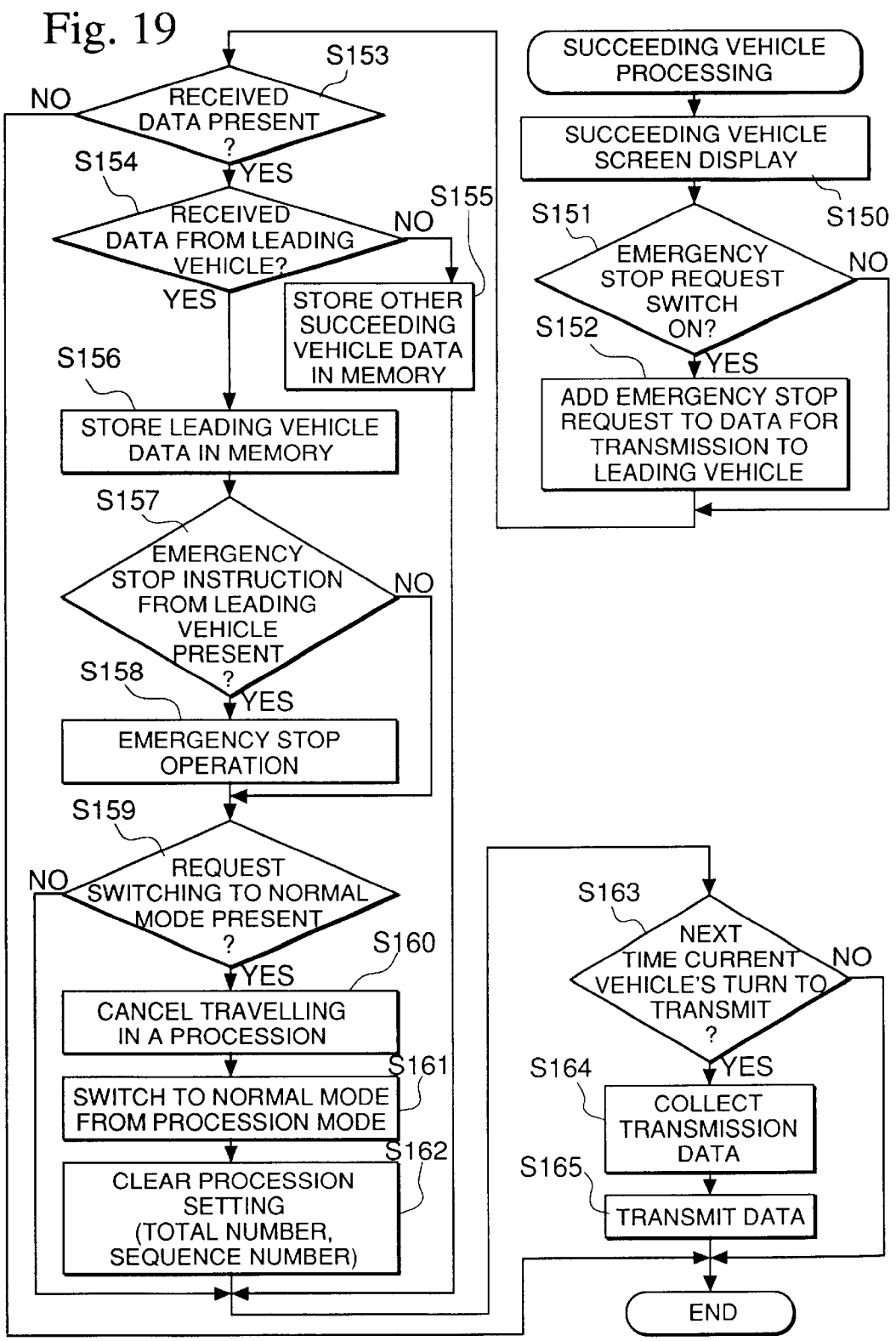
FIG. 19 is a flowchart showing succeeding vehicle processing in a case where a forward travelling procession and a reverse travelling procession are possible.

Next is a description of the succeeding vehicle processing in step S98 of FIG. 16, in accordance with the flowchart of FIG. 19.

In step S150 the screen of a succeeding vehicle is displayed on the display device 82, and control proceeds to step S151. In step S151 it is judged whether the emergency stop request switch is ON. In step S151, when judged that the emergency stop request switch is "OFF", control proceeds to step S153. In step S151, when judged that the emergency stop request switch is "ON", an emergency stop request is added to the data for transmission to the leading vehicle in step S152, and control proceeds to step S153.

In step S153 it is judged whether there is any received data. In step S153, when judged that there is no received data, control terminates. In step S153, when judged that there is received data, control proceeds to step S154, and here it is judged whether the received data are from the leading vehicle. In step S154, when judged that the received data are not from the leading vehicle, then in step S155 the data of the other succeeding vehicles are stored in memory, and control proceeds to step S163.

In step S154, when judged that the received data are from the leading vehicle, then in step S156, the data of the leading vehicle are stored in memory, and control proceeds to step S157. In step S157 it is judged whether there is an emergency stop instruction from the leading vehicle.

In step S157, when judged that there is no emergency stop instruction from the leading vehicle, control proceeds to step S159. When judged that there is an emergency stop instruction from the leading vehicle, then in step S158 an emergency stop operation is performed, and control proceeds to step S159. In step S159 it is judged whether there is a request to switch to normal mode. In step S159, when judged that there is no request to switch to normal mode, control proceeds to step S163. In step S159, when judged that there is a request to switch to normal mode, then in step S160, the processional travel (processional travel mode) is cancelled, and in the next step S161, the procession mode is switched to normal mode. Furthermore, in step S162 the procession settings (total number and order) are cleared, and control proceeds to step S163.

Next, in step S163 it is judged whether the next time is the current vehicle's turn to transmit. When the judgement result in step S163 is "NO", control terminates. When the judgement result in step S163 is "YES", then in step S164 the data for transmission are collected, and in step S165 the data are transmitted and control terminates.

Figure 20:
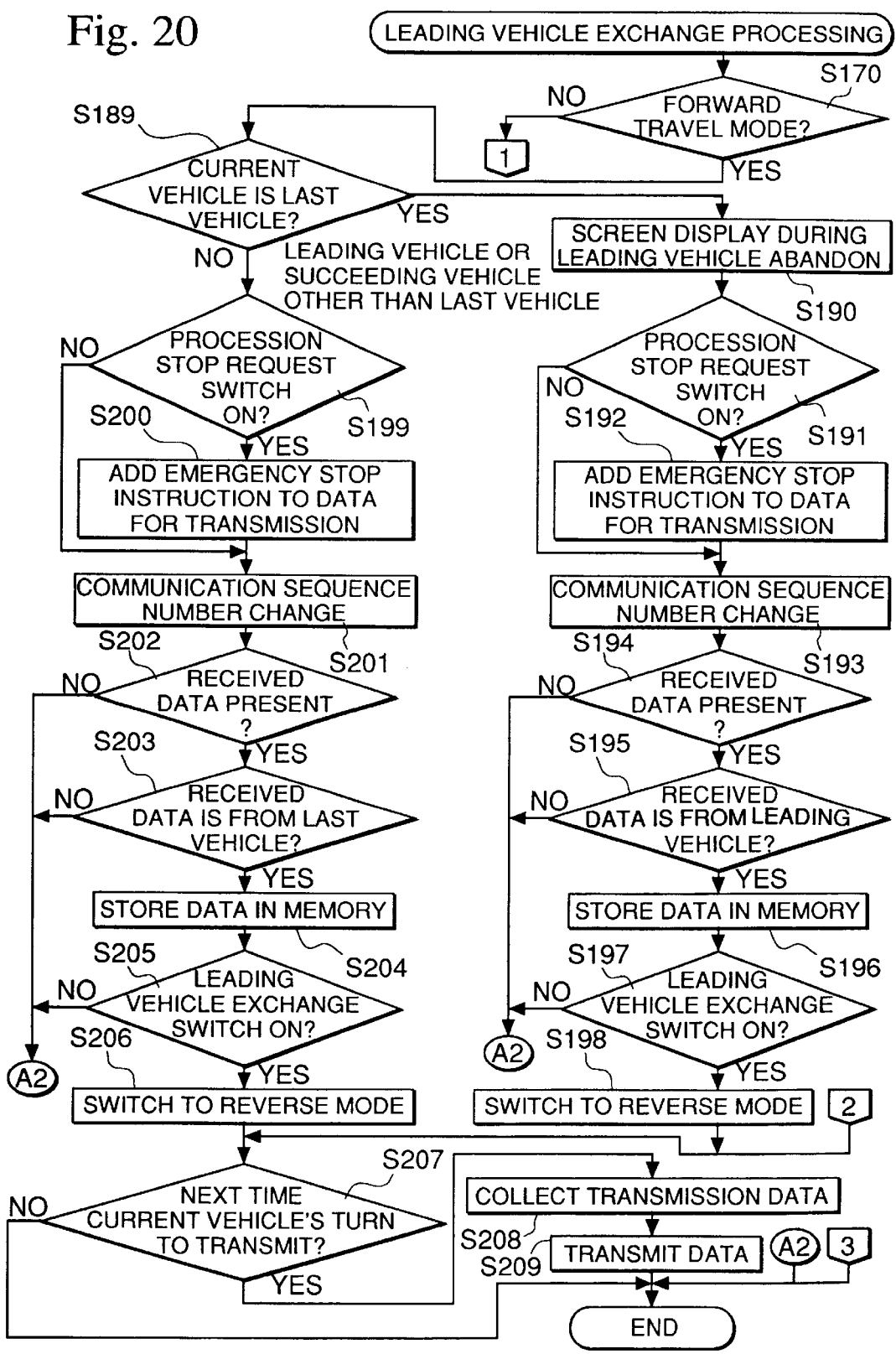
FIG. 20 is a flowchart showing leading vehicle exchange processing in a case where a forward travelling procession and a reverse travelling procession are possible.
Figure 21:
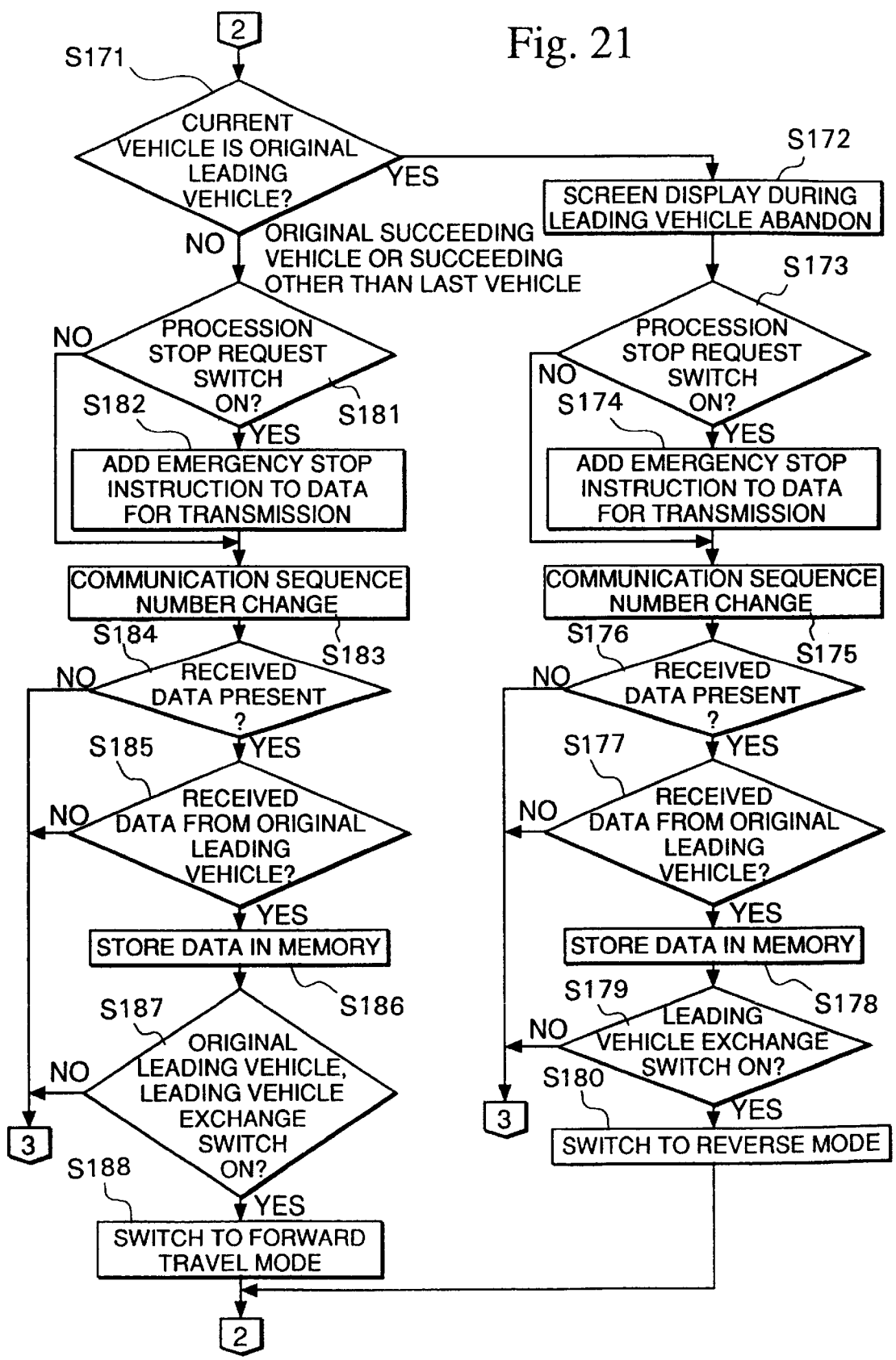
FIG. 21 is a flowchart showing leading vehicle exchange processing in a case where a forward travelling procession and a reverse travelling procession are possible.

Next is a description of the leading vehicle exchange processing in step S96 in FIG. 16, in accordance with the flowchart of FIG. 20 and FIG. 21. Here, FIG. 20 and FIG. 21 should normally be shown in one flowchart, however, for convenience of reading the Figures, the description is divided into two.

In step S170 in FIG. 20, it is judged whether the travel mode is forward. When judged that the travel mode is not forward, control proceeds to step S171 in FIG. 21. As a result of the judgement in step S170, when judged that the travel mode is forward, control proceeds to step S189, and here it is judged whether the current vehicle is the last vehicle. In step S189, when judged that the current vehicle is the last vehicle, control proceeds to step S190. In step S189, when judged that the current vehicle is not the last vehicle, that is to say, when judged that the current vehicle is the leading vehicle or a succeeding vehicle other than the last vehicle, control proceeds to step S199.

In step S199 it is judged whether the emergency stop request switch is ON. In step S199, when the emergency stop request switch is "OFF", control proceeds to step S201. In step S199, when the emergency stop request switch is "ON", an emergency stop instruction is added to the data for transmission in step S200. In step S201 the communication sequence number is changed, and control proceeds to step S202.

In step S202 it is judged whether there is any received data. In step S202, when judged that there is no received data, control terminates. In step S202, when judged that there are received data, then in step S203 it is judged whether the received data are from the last vehicle. In step S203, when judged that the received data are not from the last vehicle, control terminates. In step S203, when judged that the received data are from the last vehicle, then in step S204 the data are stored in the memory and control proceeds to step S205.

In step S205 it is judged whether the last vehicle has turned on the leading vehicle exchange switch (corresponding to the leading vehicle exchange button CB). When the judgement result in step S205 is "NO", control terminates. When the judgement result in step S205 is "YES", then in step S206 control switches to reverse travel mode, and proceeds to step S207. In step S207 it is judged whether the next time is the current vehicle's turn to transmit. In step S207, when judged that the next time is not the current vehicle's turn to transmit, control terminates. In step S207, when judged that the next time is the current vehicle's turn to transmit, the data for transmission is collected in step S208, the data are transmitted in step S209, and control terminates.

In step S189, when judged that the current vehicle is the last vehicle, then in step S190 the screen displays a leading vehicle abandon message, and control proceeds to step S191. Step S191 judges whether the emergency stop request switch is ON. In step S191, when judged that the emergency stop request switch is "OFF", control proceeds to step S193. In step S191, when judged that the emergency stop request switch is "ON", then in step S192 the emergency stop instruction is added to the data transmission, and in step S193 the communication sequence number is changed, and control proceeds to step S194. In step S194 it is judged whether there are received data. In step S194, when judged that there is no received data, control terminates. In step S195, when judged that there are received data, then in step S195 it is judged whether the received data are from the leading vehicle.

In step S195, when judged that the received data are not from the leading vehicle, control terminates. In step S195, when judged that the received data are from the leading vehicle, then in step S196 the data are stored in the memory, and control proceeds to step S197. In step S197 it is judged whether the leading vehicle exchange switch is ON. When the judgement result in step S197 is "NO", control terminates. When the judgement result in step S197 is "YES", then in step S198 control switches to the reverse travel mode, and proceeds to step S207.

When the judgement result in step S170 is "NO", and control proceeds to step S171 in FIG. 21, then in step S171, it is judged whether the current vehicle is the original leading vehicle (the last vehicle of the reverse travel). In step S171, when judged that the current vehicle is the original leading vehicle, control proceeds to step S172. In step S171, when judged that the current vehicle is not the original leading vehicle, that is to say, when judged that the vehicle is the original last vehicle or a succeeding vehicle other than the last vehicle, control proceeds to step S181.

In step S181 it is judged whether the emergency stop request switch is ON. In step S181, when judged that the emergency stop request switch is "OFF", control proceeds to step S183. In step S181, when judged that the emergency stop request switch is "ON", then in step S182 the emergency stop instruction is added to the data for transmission. In step S183 the communication sequence number is changed and control proceeds to step S184. In step S184 it is judged whether there is received data. In step S184, when judged that there is no received data, control terminates.

In step S184, when judged that there are received data, then in step S185 it is judged whether the received data are from the original leading vehicle. In step S185, when judged that the received data are not from the original leading vehicle, control terminates. In step S185, when judged that the received data are from the original leading vehicle, then in step S186 the data are stored in the memory, and control proceeds to step S187. In step S187 it is judged whether the original leading vehicle has turned the leading vehicle exchange switch ON. When the judgement result in step S187 is "NO", control terminates. When the judgement result in step S187 is "YES", control switches to the forward travel mode in step S188 and proceeds to step S207 in FIG. 20.

In step S171, when judged that the current vehicle is the original leading vehicle, then in step S172 the screen displays that the leading vehicle abandon message is received (FIG. 13A), and control proceeds to step S173. In step S173 it is judged whether the emergency stop request switch is ON. In step S173, when judged that the emergency stop request switch is "OFF", control proceeds to step S175. In step S173, when judged that the emergency stop request switch is "ON", then in step S174 the emergency stop instruction is added to the data for transmission. In step S175 the communication sequence number is changed and control proceeds to step S176.

In step S176 it is judged whether there are received data. In step S176, when judged that there is no received data, control terminates. In step S176, when judged that there are received data, then in step S177 it is judged whether the received data are from a succeeding vehicle. In step S177, when judged that the received data are not from a succeeding vehicle, control terminates. In step S177, when judged that the received data are from a succeeding vehicle, then in step S178 the data are stored in the memory, and control proceeds to step S179. In step S179 it is judged whether the leading vehicle exchange switch is ON. When the judgement result in step S179 is "NO", control terminates. When the judgement result in step S179 is "YES", then in step S180 control switches to forward travel mode, and proceeds to step S207 in FIG. 20.

Next is a description of the communication procedure in an emergency where a procession must be formed outside the ports and travel backward as described above. To be specific, the communication procedure of a case where the leading vehicle 101 abandons its position as the leading vehicle and reverse travel is performed is explained.

Here, the bracketed numerals at the beginning of each sentence in the following explanation continue from those in the communication procedure in the case of normal forward travel in the procession above.

(15) The leading vehicle 101 transmits, and then passes transmission rights to the succeeding vehicle 102. At this time, the information for abandoning the position of the leading vehicle, and the information for cancellation of the procession is added to the transmitted information from the leading vehicle 101.

(16) Next, the succeeding vehicle 102 transmits, and then passes transmission rights to the leading vehicle 101.

(17) The leading vehicle 101 transmits again, and then passes transmission rights to the succeeding vehicle 103.

(18) Next, the succeeding vehicle 103 transmits, and then passes transmission rights to the leading vehicle 101.

(19) The leading vehicle 101 transmits again, and then passes transmission rights to the last succeeding vehicle 104.

(20) The succeeding vehicle 104 transmits, and then passes the transmission rights to the leading vehicle 101. At this time, the exchange information of the leading vehicle is added to the information transmitted from the succeeding vehicle 104.

(21) The leading vehicle 101 transmits, confirms the leading vehicle exchange, and the current vehicle becomes the new last vehicle 101. At this time, the original last vehicle 104 becomes the new leading vehicle 104 for reverse travel.

(22) The new leading vehicle 104 transmits, and then passes the transmission rights to the succeeding vehicle 103.

(23) The succeeding vehicle 103 transmits, and then passes the transmission rights to the new leading vehicle 104.

(24) The new leading vehicle 104 transmits, and then passes the transmission rights to the succeeding vehicle 102.

(25) The succeeding vehicle 102 transmits, and then passes the transmission rights to the new leading vehicle 104.

(26) The new leading vehicle 104 transmits, and then passes the transmission rights to the new last vehicle 101 at the end.

(27) The new last vehicle 101 transmits, and then passes the transmission rights to the new leading vehicle 104.

(28) The above procedure (from (22) through (27)) is then repeated.

Next is a description of the communication procedure in the case where the above-mentioned new last vehicle 101 regains its position as the leading vehicle to revert to being the leading vehicle, and travels forward. To be specific, this is the case where the reverse travelling procession travels backwards far enough to revert to forward procession travel so that the original leading vehicle is returned to its position as the leading vehicle to perform forward processional travel.

(29) The new leading vehicle 104 transmits a signal, and then passes the transmission rights to the succeeding vehicle 103. At this time, the information of the position exchange of the leading vehicles, and the information for cancellation of the procession is added to the transmitted information from the new leading vehicle 104.

(30) Next, the succeeding vehicle 103 transmits a signal, and then passes the transmission rights to the new leading vehicle 104.

(31) The new leading vehicle 104 transmits, and then passes the transmission rights to the succeeding vehicle 102.

(32) Next, the succeeding vehicle 102 transmits, and then passes the transmission rights to the leading vehicle 104.

(33) The leading vehicle 104 transmits again, and then passes the transmission rights to the new last vehicle 101 at the end.

(34) The new last vehicle 101 transmits, and then passes the transmission rights to the new leading vehicle 104. At this time, the information that this vehicle is going to be the leading vehicle is added to the transmitted information from the new last vehicle 101.

(35) The new leading vehicle 104 transmits, confirms the leading vehicle position exchange, and this vehicle (the new leading vehicle 104) becomes the last succeeding vehicle 104 of the forward travel by the original leading vehicle 101.

(36) The leading vehicle 101 transmits, and then passes the transmission rights to the succeeding vehicle 102.

(37) The succeeding vehicle 102 transmits, and then passes the transmission rights to the leading vehicle 101.

(38) The leading vehicle 101 transmits, and then passes the transmission rights to the succeeding vehicle 103.

(39) The succeeding vehicle 103 transmits, and then passes the transmission rights to the leading vehicle 101.

(40) The leading vehicle 101 transmits, and then passes the transmission rights to the last succeeding vehicle 104.

(41) The succeeding vehicle 104 transmits, and then passes the transmission rights to the leading vehicle 101.

(42) The above procedure (from (36) through (41)) is then repeated.

Figure 22:
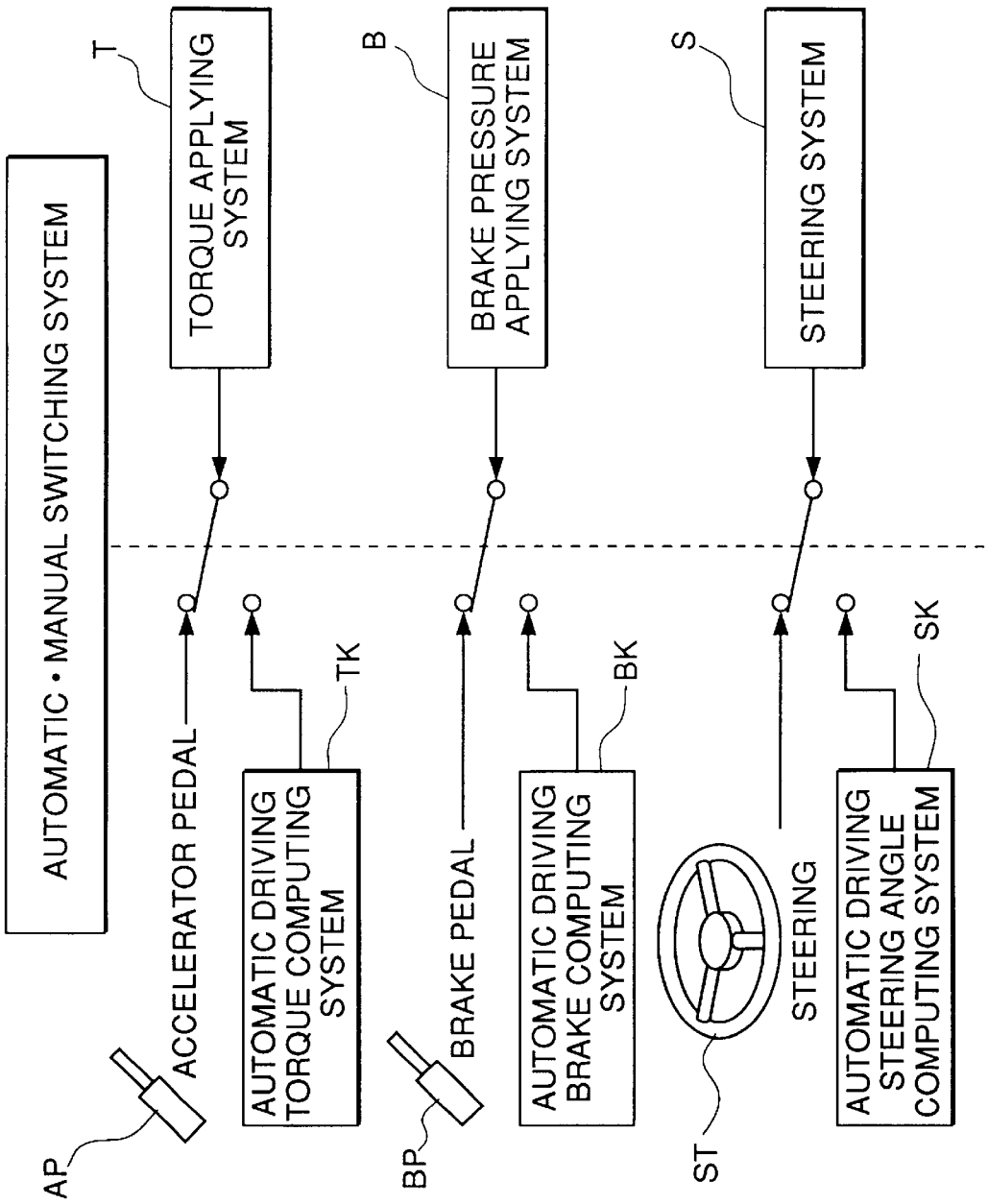
FIG. 22 is a diagram explaining the switching system.

Next, FIG. 22 shows the automatic and manual switching systems of an electric vehicle 10 common to both the first and the second embodiments. This switching system enables three systems: a torque applying system T (including the motor 44 in FIG. 4); a brake pressure applying system B (including the brake actuator 86 in FIG. 4); and a steering system S (including the steering actuator 90 in FIG. 4) to switch automatically and manually, so that each electric vehicle 10 can be driven manually as a leading vehicle, and also be driven automatically as a succeeding vehicle.

When the torque applying system T is switched to manual operation, it is connected to an accelerator pedal AP, and when switched to automatic operation, it is connected to the automatic driving torque computing system TK. When the brake applying system B is switched to manual operation, it is connected to a brake pedal BP, and when switched to automatic operation, it is connected to an automatic drive brake pressure computing system BK. When the steering system S is switched to manual operation, it is connected to a steering ST, and when switched to automatic operation, it is connected to an automatic driving steering angle computing system SK.

Accordingly, the above mentioned automatic and manual switching system is used when switching from the normal mode (manual driving) to the procession setting mode as shown in FIG. 15. Furthermore, in processional travel it is used when switching to a succeeding vehicle from the leading vehicle, and when switching to the leading vehicle from a succeeding vehicle.

With the above mentioned manual and automatic switching, in a case when the current vehicle becomes the leading vehicle, it can be switched to manual driving and in a case where the current vehicle becomes a succeeding vehicle it can be switched to automatic driving. In the flowchart of the first and second embodiments, the timing of the switching is performed as follows.

For example the arrangement can be such that, in the flowchart shown in FIG. 9, switching to manual driving is performed after step S63, and in the flowchart shown in FIG. 10, switching to automatic driving is performed after step S81.

Furthermore, the arrangement can be such that switching to manual driving is performed after step S100 in the flowchart shown in FIG. 18, and after step S161 in the flowchart shown in FIG. 19, switching to automatic driving is performed after step S206 and switching to manual driving is performed after step S198 in the flowchart shown in FIG. 20, and switching to manual driving is performed after step S188 and switching to automatic driving is performed after step S180 in the flowchart shown in FIG. 21.

Accordingly, in the second embodiment mentioned above, in addition to the effect by the above-mentioned first embodiment, in a situation where the leading vehicle enters a road under construction by mistake or enters a road with obstacles, even when forward traveling cannot be continued, and reverse travelling must be performed, it is possible to get out via the passage entered by driving the procession backward with the last succeeding vehicle 104 as the leading vehicle. Then, when a reverse travelling procession led by the new leading vehicle (the original last vehicle 104), has traveled backward far enough to a place where the new last vehicle (the original leading vehicle 101) can travel forward in procession with the original leading vehicle 101 reverting to the leading vehicle, forward travel in procession led by the leading vehicle 101 can again be performed. Therefore, the succeeding vehicles 102, 103 and 104 can be moved to their destination promptly.

As a result, depending on road condition, the processional travel is performed forward and backward, which enables the succeeding vehicles to move to the destination promptly.

As described above, according to the first aspect of the invention, since the sequence numbers and the number of vehicles in a procession can be entered by an input device, there is an effect in that formation and composition of the procession can be performed freely without choosing a place. Furthermore, the number of vehicles and the sequence number in a procession can be changed easily. Accordingly, the invention is effective when performing procession formation and travel outside the port for parking each vehicle. Moreover, there is an effect that the invention is also applicable for the case when, to collect a vehicle that has left, the procession is driven by a driver to the location of the vehicle that has left and reformed to recover it.

According to the second aspect of the present invention, there is an effect in that, in the situation where a leading vehicle, by mistake, enters a road under construction, or enters a road with obstacles, even when forward travel cannot be continued, and reverse travel is unavoidable, it is possible to get out via the passage entered by driving the procession backward with the last succeeding vehicle as the leading vehicle.

According to the third aspect of the present invention, when a reverse travelling procession led by the new leading vehicle (the original last vehicle) has traveled backward far enough to a place where the new last vehicle (the original leading vehicle) can travel forward in a procession, with the original leading vehicle reverting to the leading vehicle, forward travel in a procession led by the original leading vehicle can again be performed. Therefore, there is an effect in that the succeeding vehicles can be moved to their destination promptly.

According to the fourth aspect of the present invention, for example, while travelling with a succeeding vehicle having an occupant, when any trouble occurs, it is possible to stop the automatically travelling succeeding vehicles safely. Therefore, there is an effect in that it is possible to perform safe processional travel with the flexibility to respond to various changeable road conditions.

Although there have been described what are at present considered to be the preferred embodiments of the invention, it will be understood that variations and modifications may be made there to without departing from the gist, spirit or essence of the invention. The scope of the invention is indicated by the appended claims.

What is claimed is:

1. A processional travel control apparatus that allows processional travel with a leading vehicle driven by a driver and a plurality of succeeding vehicles automatically following the leading vehicle, wherein each of the vehicles comprises:

input means for entering a total number of vehicles in a procession and a sequence number of each vehicle in the procession;

vehicle setting means for setting each vehicle as either a leading vehicle or a succeeding vehicle according to the sequence number of each vehicle in the procession as set by said input means; and vehicle travel control means for instructing each vehicle to travel in a procession according to the set sequence number in the procession.

2. A processional travel control apparatus according to claim 1, wherein the processional travel control apparatus comprises a reverse travel means for driving the procession backward by setting a last vehicle of the procession as a temporary leading vehicle, by using said input means, and having a driver drive the last vehicle with the other vehicles following said last vehicle.

3. A processional travel control apparatus according to claim 2, wherein when said reverse travel finishes, said input means resets the authority of leading vehicle back to the original leading vehicle from the last vehicle so that normal travel in a procession is resumed.

4. A processional travel control apparatus according to claim 3, wherein the apparatus comprises a procession stop means is provided for stopping travel in a procession when an abnormality occurs, by sending an abnormality signal to each succeeding vehicle from a last manned vehicle.

5. A processional travel control apparatus according to claim 2, wherein the apparatus comprises a procession stop means for stopping travel in a procession when an abnormality occurs, by sending an abnormality signal to each succeeding vehicle from a last manned vehicle.

* * * * *

UNITED STATES PATENT AND TRADEMARK OFFICE
CERTIFICATE OF CORRECTION

PATENT NO. : 6,285,929 B1
DATED : September 4, 2001
INVENTOR(S) : Hashimoto

Page 1 of 1

It is certified that error appears in the above-identified patent and that said Letters Patent is hereby corrected as shown below:

<u>Title page,</u>
After "[74] *Attorney, Agent, or Firm*", change "Williwm" to-- William --.

<u>Column 10,</u>
Line 9, before "S65" insert -- step --;
Line 22, delete "in step S66".

<u>Column 17,</u>
Line 19, change "Judged" to -- judged --;
Line 54, change "S100" to -- S140 --.

<u>Column 23,</u>
Line 2, change "S100" to -- S140 --.

<u>Column 24,</u>
Line 14, change "there to" to -- thereto --.

Signed and Sealed this

Twenty-sixth Day of March, 2002

*Attest:*

JAMES E. ROGAN
*Attesting Officer*    *Director of the United States Patent and Trademark Office*